(12) United States Patent
Finneran

(10) Patent No.: US 12,168,252 B2
(45) Date of Patent: Dec. 17, 2024

(54) ENVIRONMENTAL BIOREMEDIATION SUBSTRATE FROM ANIMAL BY-PRODUCTS AND USE AND FORMATION THEREOF

(71) Applicant: CLEMSON UNIVERSITY, Clemson, SC (US)

(72) Inventor: Kevin Finneran, Clemson, SC (US)

(73) Assignee: CLEMSON UNIVERSITY, Clemson, SC (US)

(*) Notice: Subject to any disclaimer, the term of this patent is extended or adjusted under 35 U.S.C. 154(b) by 698 days.

(21) Appl. No.: 16/454,995

(22) Filed: Jun. 27, 2019

(65) Prior Publication Data
US 2020/0001337 A1    Jan. 2, 2020

Related U.S. Application Data

(60) Provisional application No. 62/690,573, filed on Jun. 27, 2018.

(51) Int. Cl.
| | | |
|---|---|---|
| *B09C 1/10* | (2006.01) | |
| *B09C 1/00* | (2006.01) | |
| *C02F 3/34* | (2023.01) | |
| *C09K 17/32* | (2006.01) | |

(52) U.S. Cl.
CPC ............ *B09C 1/10* (2013.01); *B09C 1/002* (2013.01); *C02F 3/348* (2013.01); *C09K 17/32* (2013.01); *C02F 2305/06* (2013.01)

(58) Field of Classification Search
None
See application file for complete search history.

(56) References Cited

U.S. PATENT DOCUMENTS

| | | | |
|---|---|---|---|
| 5,578,210 | A | 11/1996 | Klecka |
| 5,888,396 | A | 3/1999 | Perriello |
| 6,110,372 | A | 8/2000 | Perriello |
| 6,344,355 | B1 | 2/2002 | Hince et al. |
| 6,596,190 | B1 | 7/2003 | Igawa et al. |

(Continued)

FOREIGN PATENT DOCUMENTS

| | | | |
|---|---|---|---|
| DE | 20 2011 100270 | * | 9/2012 |
| WO | WO 2015/138848 | | 9/2015 |

OTHER PUBLICATIONS

Front. Microbiol., Dec. 12, 2014 | https://doi.org/10.3389/fmicb.2014.00697 Cost effective technologies and renewable substrates for biosurfactants' production Ibrahim M. Banat, Surekha K. Satpute, Swaranjit S. Cameotra, Rajendra Patil and Narendra V. Nyayanit (Year: 2014).*

(Continued)

*Primary Examiner* — Charles R Nold
(74) *Attorney, Agent, or Firm* — DORITY & MANNING, P.A.

(57) ABSTRACT

Disclosed are bioremediation substrates that include animal-based proteins and animal-based lipids that can function as electron donors in microbial respiration. The bioremediation substrates have been developed from animal by-products, such as rendered animal co-products. The bioremediation substrates can be utilized in restoration of subsurface environments, such as soil, sediment, and water, that have been impacted by one or more environmental contaminants, such as chlorinated solvents and metals such as chromium.

7 Claims, 19 Drawing Sheets

(56) References Cited

U.S. PATENT DOCUMENTS

| | | | |
|---|---|---|---|
| 7,138,059 | B2 | 11/2006 | Sorenson, Jr. et al. |
| 8,608,968 | B2 | 12/2013 | Bryant et al. |
| 2002/0090697 | A1 | 7/2002 | Hince |
| 2003/0211594 | A1 | 11/2003 | Rosebrook |
| 2004/0043474 | A1* | 3/2004 | Newman ............... B09C 1/002 |
| | | | 435/262.5 |
| 2004/0134248 | A1* | 7/2004 | Smith .................. C05F 1/007 |
| | | | 71/15 |
| 2005/0263454 | A1 | 12/2005 | Sorenson, Jr. |
| 2006/0000767 | A1 | 1/2006 | Trauger et al. |
| 2009/0127208 | A1* | 5/2009 | Berkowitz ............ B01J 20/02 |
| | | | 428/323 |
| 2011/0008876 | A1 | 1/2011 | Scalzi et al. |
| 2017/0151593 | A1* | 6/2017 | Chai .................... C02F 3/341 |

OTHER PUBLICATIONS

Mortes-Zarazua et al. "Effect of Keratin Structures from Chicken Feathers on Expansive Soil Remediation"; Advances in Materials Science and Engineering; vol. 2015, Article ID 907567, 10 pages http://dx.doi.org/10.1155/2015/907567 (Year: 2015).*

Banat, et al. "Cost effective technologies and renewable substrates for biosurfactants' production" Front. Microbiol. 5:697 (2014) pp. 1-18.

Bradley, et al. "Aerobic Mineralization of MTBE and tert-Butyl Alcohol by Stream-Bed Sediment Microorganisms" Environ. Sci. Technol. 33 (1999) pp. 1877-1879.

Coghe, et al. "Validation and Prognostic Value of Plasma Lactate Measurement in Bovine Respiratory Disease" Vet. J. 160 (2000) pp. 139-146.

Das, et al. "Microbial Degradation of Petroleum Hydrocarbon Contaminants: An Overview" Biotechn. Res. Intl. 2011:941810 (2010) pp. 1-13.

Finneran, et al. "Multiple influences of nitrate on uranium solubility during bioremediation of uranium-contaminated subsurface sediments" Environ. Microbiol. 4(9) (2002) pp. 510-516.

Holmes, et al. "Enrichment of Members of the Family Geobacteraceae Associated with Stimulation of Dissimilatory Metal Reduction in Uranium-Contaminated Aquifer Sediments" Appl. Environ. Microbiol. 68(5) (2002) pp. 2300-2306.

Kanitkar, Y. "Evaluation of Dichloromethane as an Electron Donor for Reductive Dechlorination of Tetrachloroethene to Ethene" Clemson U. (2012) pp. 1-78.

Kwon, et al. "Microbially Mediated Biodegradation of Hexahydro-1,3,5-Trinitro-1,3,5-Triazine by Extracellular Electron Shuttling Compounds" Appl. Environ. Microbiol. 72(9) (2006) pp. 5933-5941.

Lee, et al. "Comparison between acetate and hydrogen as electron donors and implications for the reductive dehalogenation of PCE and TCE" J. Contam. Hydrol. 94 (2007) pp. 76-85.

McKelvie, et al. "Evaluation of TCE and MTBE in situ Biodegradation: Integrating Stable Isotope, Metabolic Intermediate, and Microbial Lines of Evidence" Ground Water Monit. Remed. 27(4) (2007) pp. 63-73.

Rogier, A. "Animal Co-Products as Novel Electron Donors for Biodegradation of Trichlorethylene" Clemson U. (2018) pp. 1-125.

Simpkins, L.A. "Influence of Natural Organic Matter on Plutonium Sorption to Gibbsite" Clemson U. (2011) pp. 1-141.

* cited by examiner

ENVIRONMENTAL BIOREMEDIATION SUBSTRATE FROM ANIMAL BY-PRODUCTS AND USE AND FORMATION THEREOF

CROSS REFERENCE TO RELATED APPLICATION

This application claims filing benefit of U.S. Provisional Patent Application Ser. No. 62/690,573, having a filing date of Jun. 27, 2018, entitled "Rendered Animal Co-Products as Electron Donors for Environmental Remediation," which is incorporated herein by reference for all purposes.

BACKGROUND

Environmental contamination remains a serious threat to the health and well-being of humans, as well as to local plant and animal life. Approaches to remediation of contaminated areas include ex situ removal approaches and in situ approaches. Ex situ approaches involve physical removal of contaminated soils and groundwater from the area for decontamination treatment or disposal elsewhere. For instance, in the case of contaminated ground water, wells are drilled into the area and contaminated ground water is pumped above the surface, where it is treated to remove the contaminants. Removal approaches are expensive, due in part to the large volumes of soil and water that must be removed and treated to ensure full decontamination of the site. Moreover, this approach often presents serious practical issues in contaminant removal due to access difficulties—for instance, if contaminants are underneath existing buildings, pipelines, or other structures—and due to extraction difficulties—for instance, if contaminants have limited solubility in ground water. Economic and societal costs of the removal approach (building destructions, business closings, residence relocations, etc.) can thus become prohibitively expensive.

In situ approaches, in which contaminated soil and groundwater is treated in place through application of a remediation substrate to the area, is highly preferable to removal approaches for cost savings, as well as the preservation of the local area. In situ bioremediation, in which a natural or augmented microbial population is utilized to encourage natural degradation of contaminants in an area, is even more preferable, as it can require application of fewer substrate materials to an area, and the natural degradation of contaminants by the microbial population can provide low impact sustainable decontamination with natural non-toxic and innocuous end products.

Bioremediation substrates stimulate microbial activity in the contaminated area to encourage and accelerate the natural biochemical degradation of the contaminants. Preferred bioremediation substrates can vary depending upon the type of organisms being used, the type of contaminant, the desired degradation products, and the conditions at the contaminated site. For instance, one or more of electron donors, electron acceptors, microbial growth factors, and stabilizing agents can be applied to enhance in situ bioremediation processes.

Large classes of environmental contaminants are degraded through biochemical reduction to innocuous forms, and the addition of a bioremediation substrate that includes an electron donor can stimulate and accelerate the microbial respiration or co-metabolic reduction of these reducible contaminants (e.g., chlorinated solvents, explosives, nitrates and other agricultural chemicals, metals and metalloids, etc.). Electron donors for bioremediation have been described, including short-chain fatty acids and other small acid compounds, small alcohols and diols, hydrogen, plant-based extracts, and many others (see, e.g., U.S. Pat. Nos. 5,277,815 and 5,578,210). More recently, higher molecular mass synthetic and plant-based electron donors have been developed. Unfortunately, current bioremediation substrates are insufficient in activity, extremely expensive, and/or present potential environmental consequences in their own right (e.g., in formation of synthetic substrates).

What are needed in the art are bioremediation substrates that can provide high activity electron donors in useful quantities and at reasonable costs.

SUMMARY

According to one embodiment, disclosed are bioremediation substrates that include an electron donor. The electron donor includes both a protein constituent and a lipid constituent. The protein constituent is an animal-based protein constituent and, as such, includes animal protein or identifiable fragments thereof, such as collagen, elastin, keratin, albumin, hemoglobin, etc. The lipid constituent is also animal-based and can include animal lipid and, as such, the lipid constituent can have an iodine number of about 70 or less and/or a Reichert-Meissl-Wollny (RMW) number of about 10 or greater. The bioremediation substrate can also include a carrier, e.g., a liquid carrier or a granulated rock, mineral, or soil material. The bioremediation substrate can also include one or more carbohydrates or other animal co-products, such as bone, animal-based macromolecules, and the like, as well as other additives such as an emulsifier, microbial growth factor, etc.

Also described are methods for promoting anaerobic microbial respiration in environmental bioremediation; for instance, according to direct microbial transformation of a contaminant or contaminant transformation by secondary chemical reactions that are facilitated by microbial activity. The method can include combining a bioremediation substrate with a microbial population and a contaminant. The bioremediation substrate includes an electron donor. The electron donor includes a protein constituent that in turn includes animal protein or fragments thereof and a lipid constituent that includes animal lipid. In methods that encompass direct microbial transformation of a contaminant, the microbial population is capable of utilizing the contaminant as an electron acceptor and utilizing the electron donor in respiration, e.g., halorespiration. As such, upon the combination, the contaminant can be degraded through microbial respiration to produce one or more non-toxic respiration products.

Also described is a method for forming a bioremediation substrate that can include combining rendered animal co-products with a carrier. The rendered animal co-products can include animal proteins, or fragments thereof, and animal lipids. In some embodiments, the method can include combining one or more additional materials in the bioremediation substrate, such as an emulsifier, a microbial growth factor, a stabilizing agent, etc.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
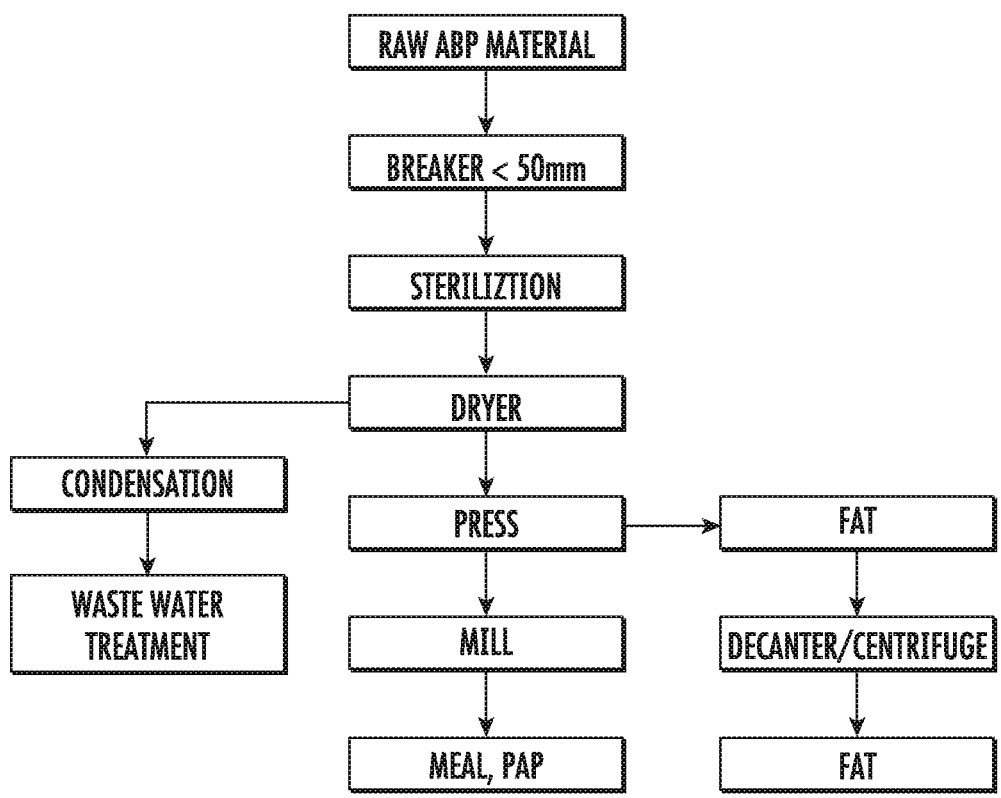
FIG. 1 presents a prior art method for forming rendered animal co-products from animal by-products.
Figure 2:
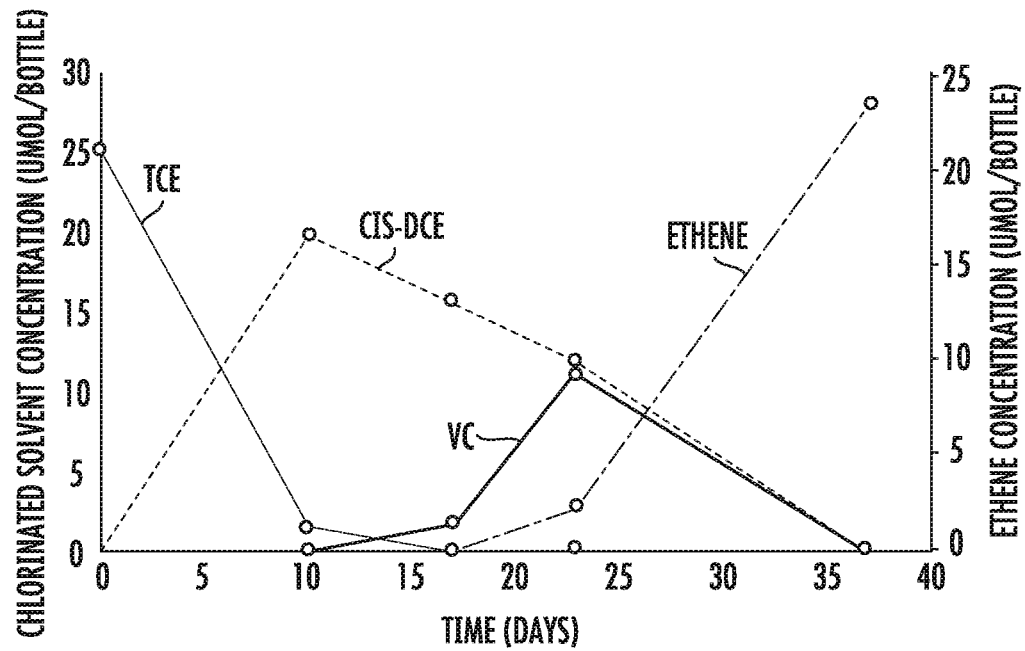
FIG. 2 illustrates biodegradation results for various microbial respiration products using as bioremediation substrate a 9:1 (mass:mass) combination of tallow and known rendering coproduct LoPro2.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

Disclosed are bioremediation substrates that include animal-based proteins and lipids as electron donors. The bioremediation substrates have been developed from animal by-products. In one embodiment, the bioremediation substrates have been developed from animal by-products that have been treated in some fashion so as to remove or degrade pathogens, e.g., that have been treated according to a heating or sterilization process. For instance, in one particular embodiment, the bioremediation substrates have been developed from rendered animal co-products. As utilized herein, the term "animal by-products," alternatively referred to herein as "by-products," generally refers to animal tissue that is not directly consumed by humans. As utilized herein, the term "animal co-products," alternatively referred to herein as "co-products," generally refers to animal by-products that have been subjected to some type of treatment following separation from the consumable materials. In one embodiment, the bioremediation substrates can be developed from rendered animal co-products. The bioremediation substrates can be developed from waste animal tissue produced in slaughterhouse operations. However, it should be understood that bioremediation substrates described herein are not limited to those developed from slaughterhouse production and can include any source of animal by-product tissue including, without limitation, animal by-products from butcher shops, restaurants, food markets, etc.

The bioremediation substrates can be beneficially utilized in restoration of subsurface environments, such as soil, sediment, and water, that have been impacted by one or more environmental contaminants. Beneficially, the bioremediation substrates can include both lipid and protein compounds that can function as electron donors in microbial respiration, and as such, can be more effective than lipid-only electron donors as have been previously developed. For instance, and as further described in the examples section herein, disclosed bioremediation substrates can often encourage complete biodegradation to innocuous respiration products at a faster rate than previously known lipid-only bioremediation substrates.

As the bioremediation substrates include a combination of protein-based electron donors and lipid-based electron donors developed from a characterized source, the content of the substrates can be modified and optimized to provide substrates with an activity level designed for a particular contaminant and/or contamination level. This can be beneficial in controlling microbial population during decontamination, as well as in controlling respiration products. For instance, the activity level of a bioremediation substrate can be modified for a particular microbial population and/or a particular contaminant type/concentration according to one or more of the protein/lipid mass content ratios, the content of a particular lipid type (increased or decreased content of oils, fatty acids, saturated fats, etc.), and the amount of inert carrier included with the active components of the substrate. Substrate content design can be used to control the formation of respiration products, such as methane (which is generally considered to be not beneficial) and ethene (which is generally preferred over methane generation), by the microbial population. By way of example, the activity level of the bioremediation substrate can be designed for a particular contaminant remediation process so as to encourage formation of ethene while limiting or completely avoiding formation of methane.

Yet another benefit of disclosed bioremediation substrates is economical. The source animal by-products utilized in forming the bioremediation substrates can be much less expensive than source materials currently utilized to form bioremediation substrates. In addition, the source materials can require relatively little processing in order to be utilized in treatment of contaminated materials. As such, disclosed substrates can be much more cost effective as compared to currently known bioremediation substrates.

In some embodiments, a bioremediation substrate can include one or more rendered co-products. Rendering encompasses processing of animal by-products so as to stabilize or otherwise treat the by-products and allows for the efficient removal, decontamination, and repurposing of the very large by-product stream from livestock and slaughterhouse operations. FIG. 1 presents a flow chart describing typical rendering operations. As shown, a rendering process can include decreasing the size of the raw animal by-products (ABP), for instance to a size of about 50 millimeters (mm) or less. Following, the chopped ABP can be sterilized, usually via heating, either with or without steam. The sterilized product can then be dried and subjected to separation protocols. Typical separation protocols generally separate the bulk product according to lipid and protein content. For instance, pressing of the dried materials can provide a first co-product that is primarily lipids in content and a second co-product that is primarily protein in content. The lipid-rich and protein-rich materials can then be further processed and separated, as desired, to provide a variety of different animal co-products as are known in the art, e.g., feather meal, bone meal, tallow, brown grease, etc., each of which will generally include a characteristic fat/protein content.

As stated, a bioremediation substrate can include an electron donor that, in turn, includes a protein constituent and a lipid constituent. The relative amounts of the protein and lipid components can vary, for instance, from a predominantly protein-containing substrate that includes only a trace amount of lipid to a predominantly lipid-containing substrate that includes only a trace amount of protein. By way of example, the protein constituent of the electron donor can generally be from about 0.1 wt. % to about 99.9 wt. % of the total mass of the electron donor. For instance, the electron donor can include the protein constituent in an amount of about 99.9 wt. % or less; about 99 wt. % or less; about 95 wt. % or less; about 90 wt. % or less; about 80 wt. % or less; about 70 wt. % or less; about 60 wt. % or less; about 50 wt. % or less; about 40 wt. % or less; about 30 wt. % or less; about 20 wt. % or less; about 10 wt. % or less; about 5 wt. % or less; or about 1 wt. % or less, provided that the electron donor includes at least a detectable amount of the protein constituent, e.g., about 0.1 wt. % or more; about 1 wt. % or more; about 2 wt. % or more; about 5 wt. % or more; about 10 wt. % or more; about 20 wt. % or more; about 30 wt. % or more; about 40 wt. % or more; about 50 wt. % or more; about 60 wt. % or more; about 70 wt. % or more; about 80 wt. % or more; about 90 wt. % or more; or about 95 wt. % or more in some embodiments.

The protein constituent is animal-based and, as such, can include one or more whole or slightly denatured but still identifiable animal proteins. For instance, the protein constituent can include one or more of collagen, elastin, keratin, albumin, hemoglobin, or other animal proteins (or recognizable denatured fragments thereof) commonly present in animal co-products.

The bioremediation substrate can also include a lipid constituent that includes one or more animal lipids. For instance, the lipid constituent of an electron donor component can have an iodine number of about 70 grams (g) or less, about 60 g or less, about 50 g or less, or about 40 g or less in some embodiments. The iodine number is the amount of iodine in grams taken up by 100 grams of the lipid constituent. In some embodiments, the lipid constituent can have a Reichert-Meissl-Wollny (RMW) number of about 10 or greater, about 20 or greater or about 30 or greater in some embodiments. The Reicher-Meissl-Wollny number is equal to the number of mg of 0.1 N hydroxide solution necessary for the neutralization of the water-soluble volatile fatty acids distilled and filtered from 5 grams of the lipid constituent of an electron donor.

As with the protein constituent, the lipid constituent can make up any portion of the electron donor, provided the electron donor include at least a trace detectable amount of the lipid constituent. By way of example, the lipid constituent of the electron donor can generally be from about 0.1 wt. % to about 99.9 wt. % of the total mass of the electron donor. For instance, the electron donor can include the lipid constituent in an amount of about 99.9 wt. % or less; about 99 wt. % or less; about 95 wt. % or less; about 90 wt. % or less; about 80 wt. % or less; about 70 wt. % or less; about 60 wt. % or less; about 50 wt. % or less; about 40 wt. % or less; about 30 wt. % or less; about 20 wt. % or less; about 10 wt. % or less; about 5 wt. % or less; or about 1 wt. % or less, provided that the electron donor includes at least a detectable amount of the lipid constituent, e.g., about 0.1 wt. % or more; about 1 wt. % or more; about 2 wt. % or more; about 5 wt. % or more; about 10 wt. % or more; about 20 wt. % or more; about 30 wt. % or more; about 40 wt. % or more; about 50 wt. % or more; about 60 wt. % or more; about 70 wt. % or more; about 80 wt. % or more; about 90 wt. % or more; or about 95 wt. % or more in some embodiments.

The bioremediation substrate can include other components of an animal co-product that can function as an electron donor, in addition to the protein constituent and the lipid constituent such as, and without limitation to, carbohydrates, macromolecules, etc., as may be present in an animal co-product. In general, when present, other animal-based electron donors that are classified as neither lipids nor proteins can be present in an electron donor component of a bioremediation substrate in an amount of up to about 5 wt. % of the electron donor.

Rendering co-products as may be utilized in a bioremediation substrate are not particularly limited and can include rendering co-products as are generally known in the art. Examples of known rendering coproducts as may be included in a bioremediation substrate can include, without limitation, DAF, tallow, bone meal, free fatty acids, brown greases, yellow greases, poultry fat, TEVB, TEHB, TEFA, TE-80/20, PNM, PNG, PL, PBME+E, CWG, LoPro (1, 2, 3, or 4), meta-bone meal (MBM), feather meal, centrysis, etc., as well as any combination of rendering co-products. As mentioned previously, a bioremediation substrate can include mixtures of one or more different animal by-products, such as mixtures of rendered co-products such as those mentioned above (or any other co-product and/or other suitable animal by-product), which can be utilized to design a substrate with a predetermined reactivity for a particular embodiment, e.g., a particular microbial population, a particular contaminant or group thereof, a particular geologic location, etc.

A bioremediation substrate can include additional components, in addition to the electron donor component. For instance, a bioremediation substrate can include an inert carrier, which can be utilized in one embodiment to control the activity level of the electron donor component. Carriers can be formed of any suitable material, with preferred carriers generally depending upon the nature of the contaminants to be treated and, in those embodiments designed for in situ treatment, the nature of the area to be treated, as well as the particular treatment method to be used (e.g., direct-push, permeable reactive barrier, etc.).

In some embodiments, a carrier can be an inert granulated material that can encourage contact between the microbial population, the contaminant, and the electron donor. For instance, a solid granulated carrier can include, without limitation, sand, vermiculite or other hydrous phyllosilicate minerals, clays, soil, gravel, etc. In some embodiments, a carrier can include material from the site to be treated. For instance, soil from the site to be treated can be combined with the electron donor component and the substrate thus formed can be relocated at the site of interest in an in situ remediation application. A solid granulated carrier can generally be present in the bioremediation substrate in an amount of up to about 90 wt. % of the substrate, for instance, from about 20 wt. % to about 80 wt. %, from about 30 wt. % to about 60 wt. %, or about 50 wt. % of the substrate in some embodiments.

Liquid carriers are also encompassed herein, such as aqueous liquid carriers (e.g., water) or organic liquid carriers (e.g., emulsifiers), as well as mixtures of carriers, including mixtures of aqueous and organic liquids, for instance, in the form of an emulsion or a suspension. A liquid can generally be present in the bioremediation substrate in an amount of up to about 90 wt. % of the substrate, for instance, from about 20 wt. % to about 80 wt. %, from about 30 wt. % to about 60 wt. %, or about 50 wt. % of the substrate in some embodiments.

A bioremediation substrate can optionally include additional components that can beneficially impact the function of the substrates. For instance, a bioremediation substrate can include one or more of microbial growth factors, stabilizing agents (e.g., emulsifiers), or combinations of materials. Microbial growth factors include, without limitation, inorganic nutrients, vitamins, trace minerals, and amino acids (e.g., plant-based amino acids not present in the protein constituent). When present, such additives can generally be present in an amount of about 10 wt. % or less, or about 5 wt. % or less of a substrate in some embodiments.

In one embodiment, a bioremediation substrate can include an emulsifier, for instance, in those embodiments in which the substrate is intended for use in treatment of ground water. Examples of emulsifiers that can be incorporated in a substrate can include, without limitation, lecithin, Tween 80, sodium dodecyl sulfate (SDS), etc.

There is a wide array of contaminants for which the bioremediation substrates can be utilized, for instance, as the primary remediation strategy in a subsurface in situ environmental remediation approach. In one embodiment, the substrates can be utilized in remediation of chlorinated solvents (e.g., trichloroethylene (TCE), perchloroethylene (PCE)), which are often considered to be the most critical class of contamination in the US from a risk perspective. Other contaminants amenable to remediation by use of the disclosed substrates can include, without limitation, metals (e.g., chromium), explosives and energetics (e.g., perchlorates and cyclic nitramine explosives), agricultural chemicals (e.g., nitrates), metalloids (e.g., arsenic and selenium), as well as combinations of contaminants as may be present in environmental sites requiring clean-up.

A bioremediation substrate can provide electron donors to any microbial populations as can utilize the electron donors in respiration of a contaminant, either directly or indirectly, for instance, in those embodiments in which microbial activity facilitates a secondary chemical reaction that can transform a contaminant, e.g. a microbial respiration product interacts with the contaminant and the electron donor to degrade the contaminant.

The microbes can be naturally present in an area to be treated or can be added to the contaminant before, during, or following addition of the substrate. The microbial population can encompass bacteria, protozoa, and some fungi and algae. In one embodiment, the microbial population can include bacteria, e.g., halo-respiring bacteria. In one embodiment, biotransformation of a contaminant can be enhanced, at least in part, by stimulating indigenous, naturally occurring microbes in ground water or in ground containing a contaminant. In those embodiments in which indigenous, naturally occurring microbes are not present or are not sufficiently effective, then an appropriate microbe can be augmented to the contaminant or to a site that includes a contaminant, in conjunction with an electron donor as disclosed.

In general, a microbe can be an anaerobic or facultative anaerobic bacterium. Exemplary bacteria as may be encouraged by use of disclosed substrates can include *Dehalococcoides mccartyi* strain 195, the *Pinellas* culture, *Geobacter* sp. (e.g., *G. sulfurreducens*), the Firmicutes, and the like, and mixtures thereof. Other species, however, are known to function as described, and the present disclosure is not intended to be limited by the examples provided herein.

The bioremediation substrates can be utilized for in situ bioremediation applications, as well as in ex situ applications. For instance, in one embodiment, disclosed bioremediation substrates can be utilized in forming a permeable reactive barrier (PRB) (also commonly referred to as a permeable reactive treatment zone, for use in ground water treatment). A PRB can include a zone (e.g., about 1000 m³ or more, for instance, from about 1500 m³ to about 5000 m³ in some embodiments) that incorporates a bioremediation substrate that includes the electron donor component and a carrier, e.g., an inert geologic material. The zone of the PRB can cross a groundwater flow, e.g., approximately perpendicular to ground water flow, such that the ground water can pass through the barrier and contact the substrate. The PRB can optionally include sorbants that can passively capture contaminants in the water and can encourage bacterial respiration of the contaminants by the microbial population, which can be present in the PRB.

In one embodiment, a bioremediation substrate can be utilized in a direct-push injection approach. A direct-push approach generally uses a hollow-core drill rod, e.g., having a diameter of from about 1 to several inches. The drill rod can bore to a desired depth into the contaminated area using a disposable drill tip. Following insertion, the drill pipe can be separated from the drill tip and withdrawn partially, e.g., a few inches, and the bioremediation substrate can then be injected to the subsurface area through the drill pipe. After a period of injection, the drill pipe can be further withdrawn, and the injection process can be repeated, for instance, every 2 feet to about 10 feet from the lowest insertion point to the surface. Depending upon the size of the area to be treated, a direct-push approach can be repeated over a large area, with multiple bore holes across the area and multiple injections along each vertical bore hole.

Any delivery system as is known in the art can be used in conjunction with disclosed bioremediation substrates. As an illustrative, non-exclusive example, in an embodiment in which a contaminated region includes an aquifer, lake, river, stream, or ground water in any form or combinations thereof, a bioremediation substrate may be supplied to the treatment zone in the form of an aqueous solution. This approach may include slug injection of an aqueous solutions of the bioremediation substrate by use of a monitoring well, an injection well, a shallow well that includes a terminal depth that is above the saturated zone and/or within a vadose zone of the subsurface region, a vapor extraction well, a borehole, an infiltration gallery, a horizontal slotted pipe, a lance injection technology, and/or a push probe.

Additionally, or alternatively, a bioremediation substrate may be supplied to a treatment area as part of a groundwater recirculation treatment in which groundwater may be pumped from a suitable subsurface region, combined with a bioremediation substrate, and returned to the treatment area.

As another illustrative, non-exclusive example, and when a contaminated area includes contamination in or beneath soil, a field, a parking area, an industrial site, a commercial site, a waste disposal site, or other surface or near-surface region, a bioremediation substrate may be applied to the treatment are as an aqueous solution or dispersion or as a dry bioremediation formulation. When a bioremediation substrate is applied to a treatment area as an aqueous solution, it may be sprayed, injected, irrigated, or flooded onto the treatment area. When a bioremediation substrate is applied to the treatment area as a dry bioremediation formulation, it may be spread onto, broadcast onto, and/or mixed into the treatment area utilizing any suitable process.

Beneficially, disclosed electron donors and bioremediation substrates incorporating the electron donors can be utilized in any remediation process, either in situ or ex situ, that includes contaminants that are biochemically reducible by a microbial population.

The present disclosure may be better understood with reference to the Examples set forth below.

EXAMPLE

Trichloroethylene was utilized as a representative chlorinated solvent in the following examples. A desirable biodegradation pathway for PCE and TCE includes reduction to cis-dichloroethane (DCE), vinyl chloride (VC) and ethene as follows:

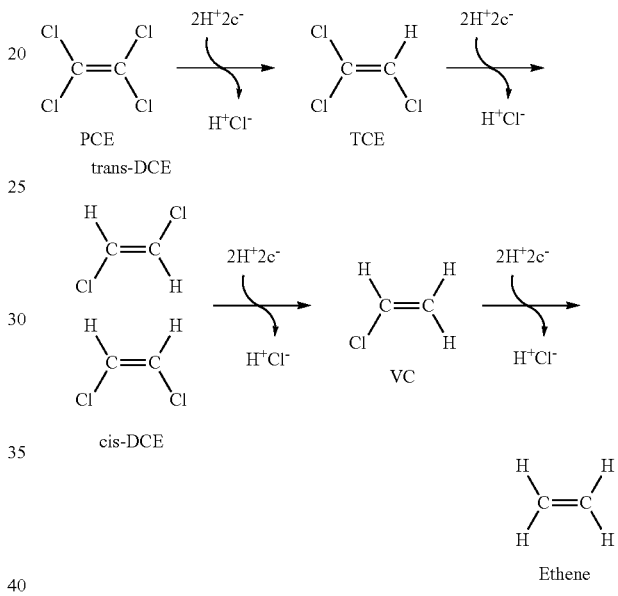

A variety of different animal co-products obtained from a rendering operation and with no pre-treatment were examined for efficacy in stimulating native microorganisms to reduce TCE to ethene. The native microorganism population was understood to include *Dehalococcoides* spp. Co-products examined included tallow, brown grease, DAF, LoPro2, TE 80/20, bone meal, chicken fat, feather meal, and MBM, were utilized alone or in various combinations. In successful degradation, one mole of TCE will provide 1 mole of ethene, so success was operationally defined as ethene production at or near 1:1 stoichiometry between TCE reduced and ethene generated.

Figure 3:
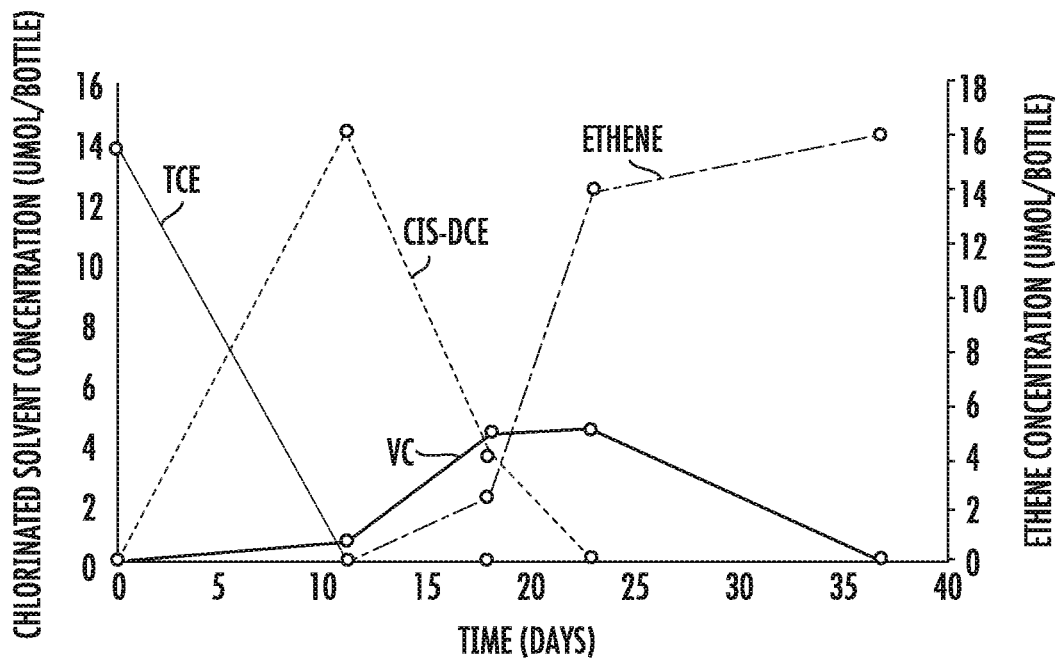
FIG. 3 illustrates biodegradation results for various microbial respiration products using as bioremediation substrate a 9:1 combination of brown grease and bone meal.
Figure 4:
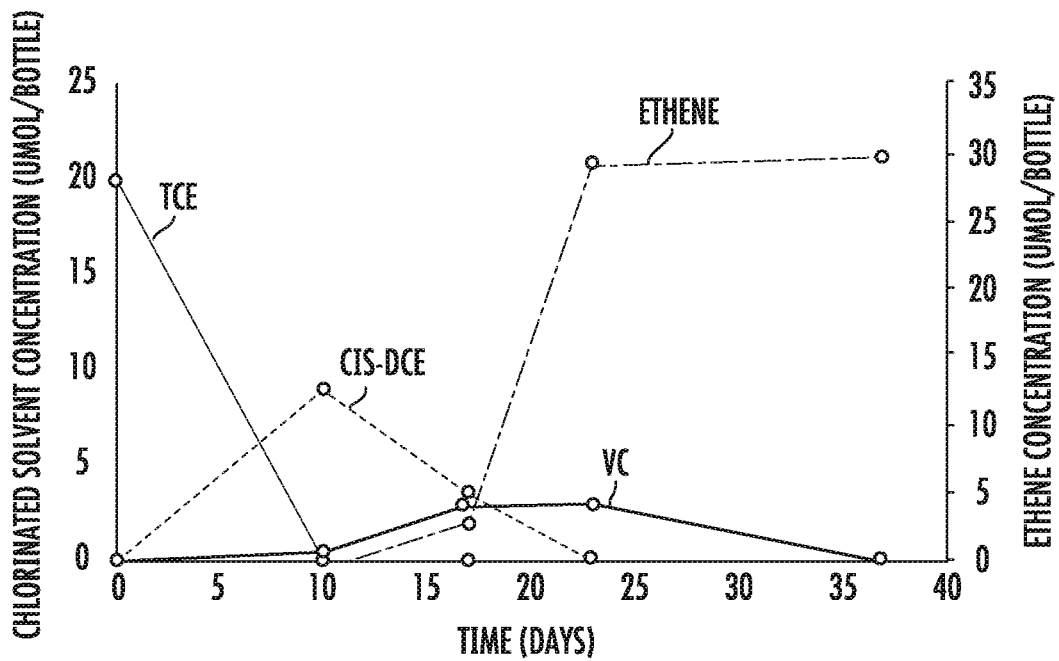
FIG. 4 illustrates biodegradation results for various microbial respiration products using as bioremediation substrate a 9:1 combination of dissolved air flotation rendering coproduct (DAF) and LoPro2.
Figure 5:
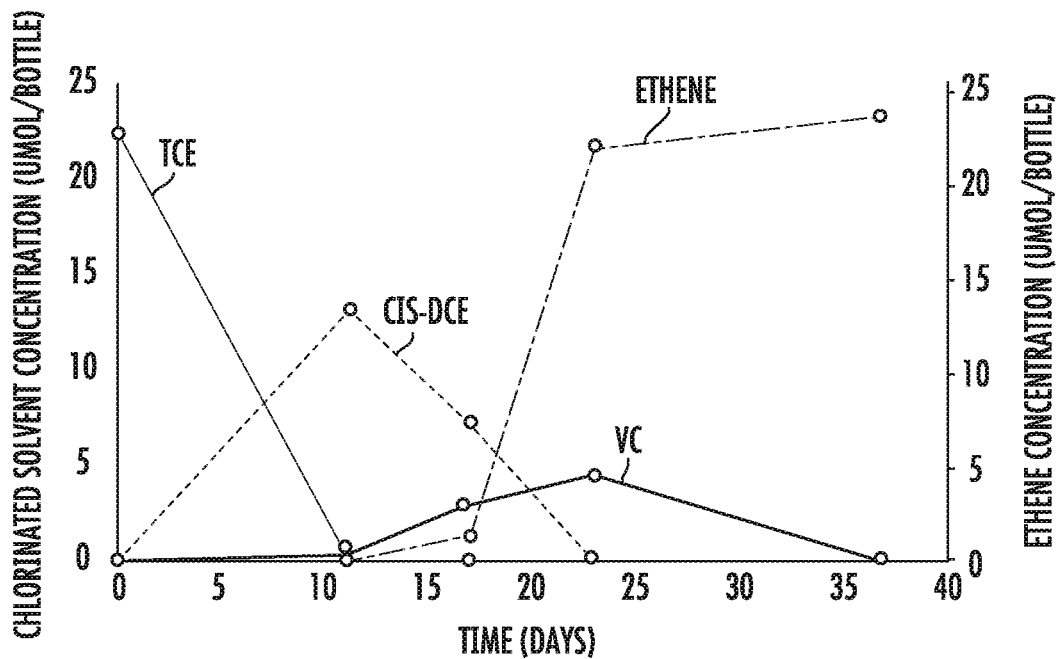
FIG. 5 illustrates biodegradation results for various microbial respiration products using as bioremediation substrate a 9:1 combination of DAF and another known rendering coproduct, TE 80/20.
Figure 6:
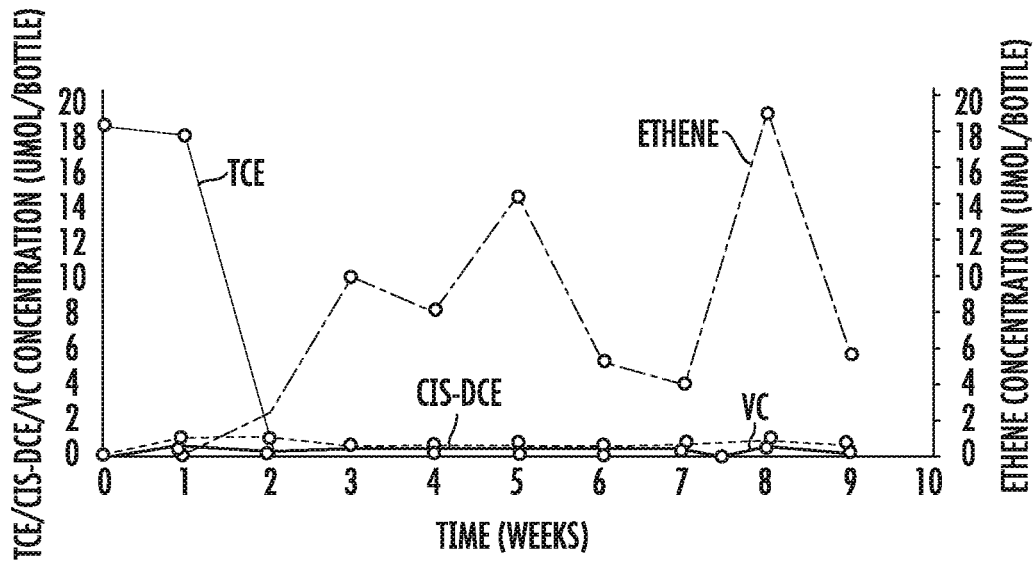
FIG. 6 illustrates biodegradation results for various microbial respiration products using bone meal as bioremediation substrate.
Figure 7:
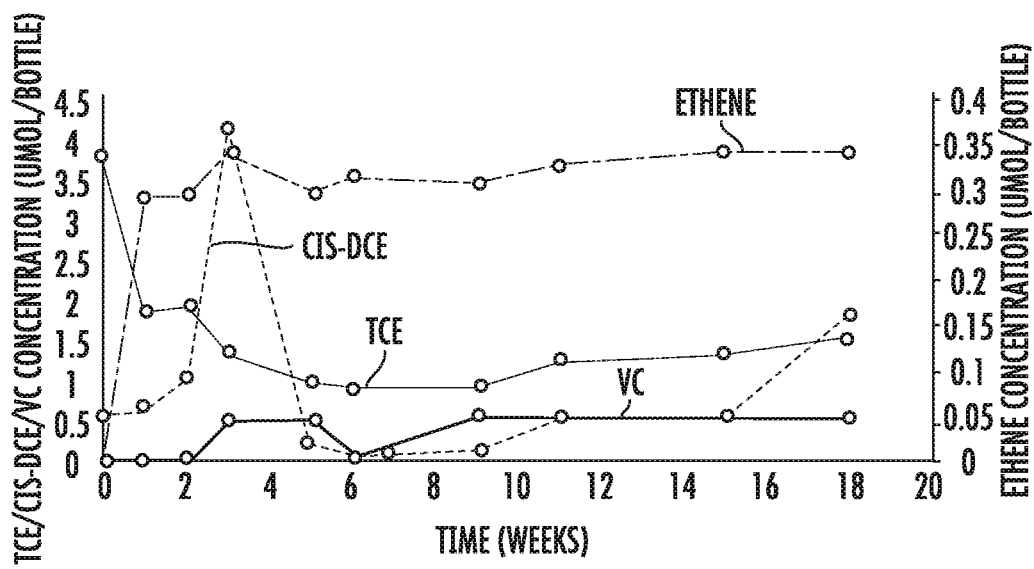
FIG. 7 illustrates biodegradation results for various microbial respiration products using bone meal as bioremediation substrate.
Figure 8:
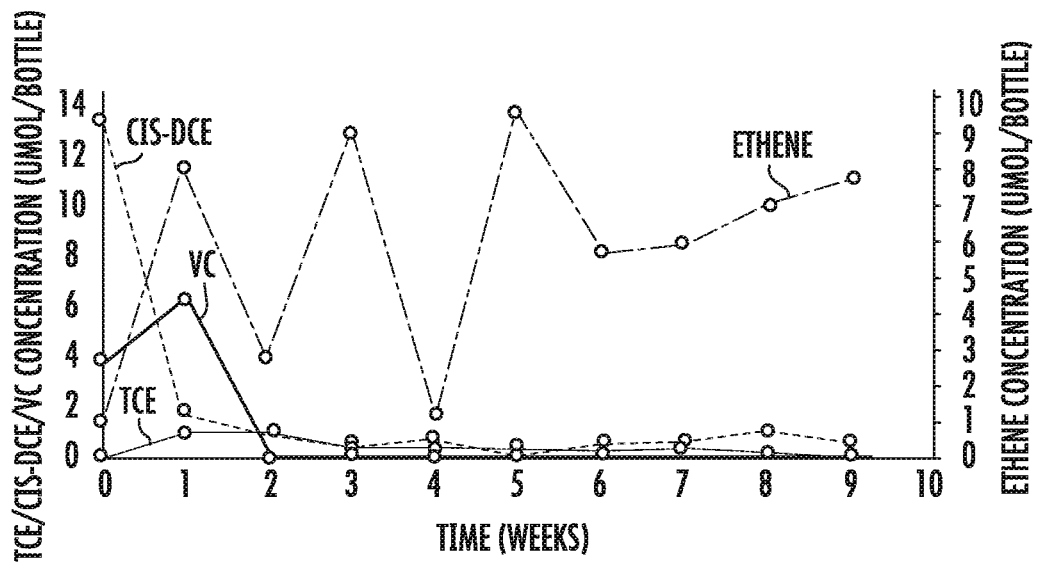
FIG. 8 illustrates biodegradation results for various microbial respiration products using bone meal as bioremediation substrate.
Figure 9:
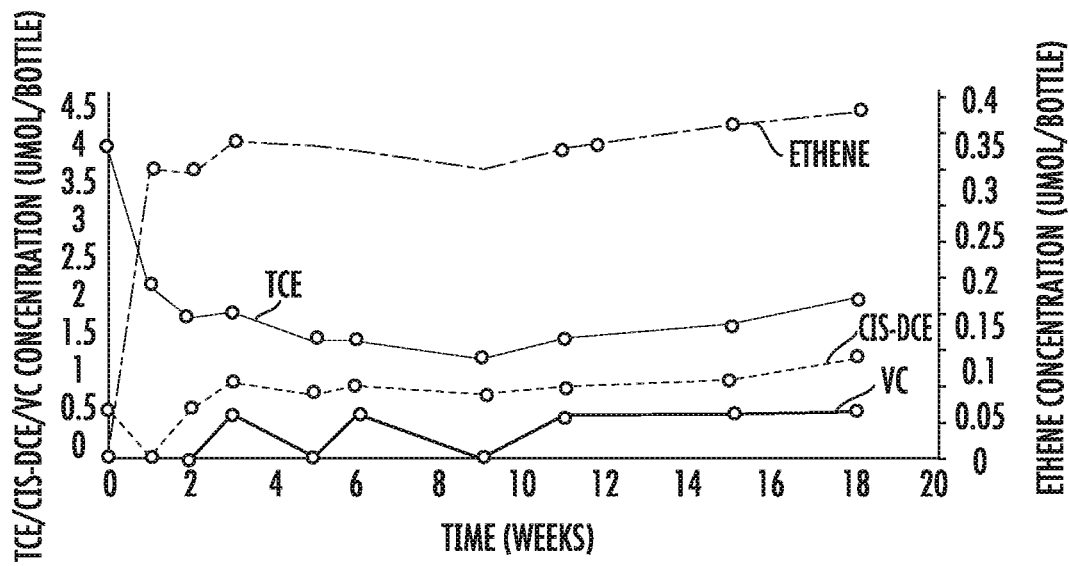
FIG. 9 illustrates biodegradation results for various microbial respiration products using bone meal as bioremediation substrate.
Figure 10:
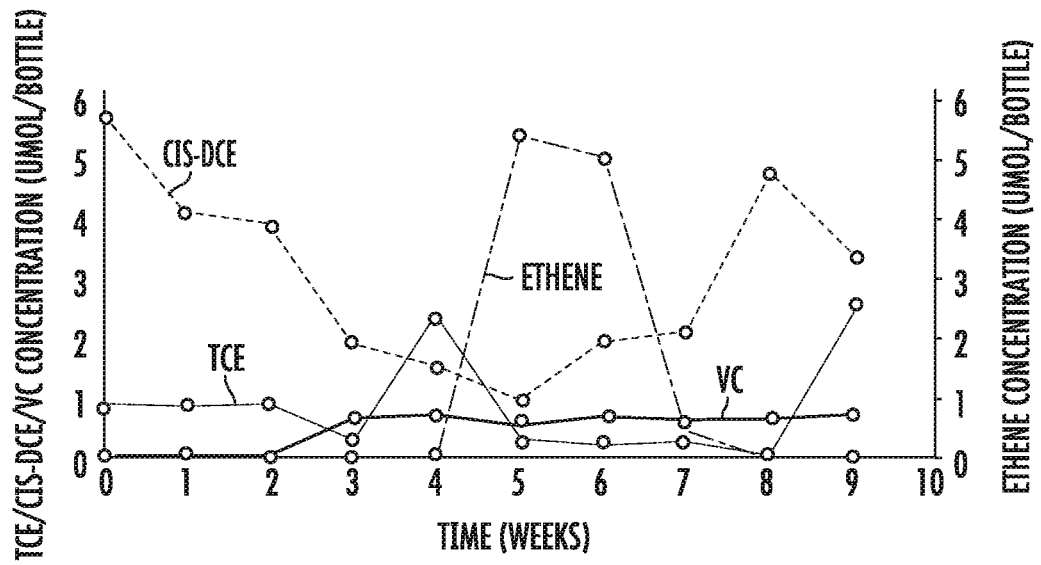
FIG. 10 illustrates biodegradation results for various microbial respiration products using chicken fat as bioremediation substrate.
Figure 11:
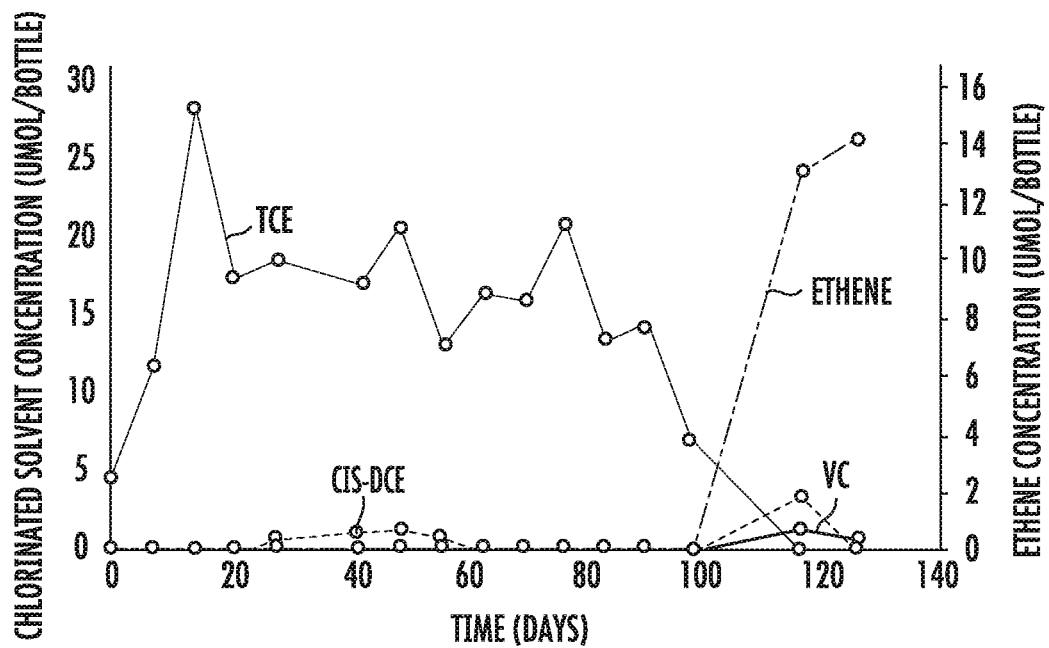
FIG. 11 illustrates biodegradation results for various microbial respiration products using lactate as bioremediation substrate.
Figure 12:
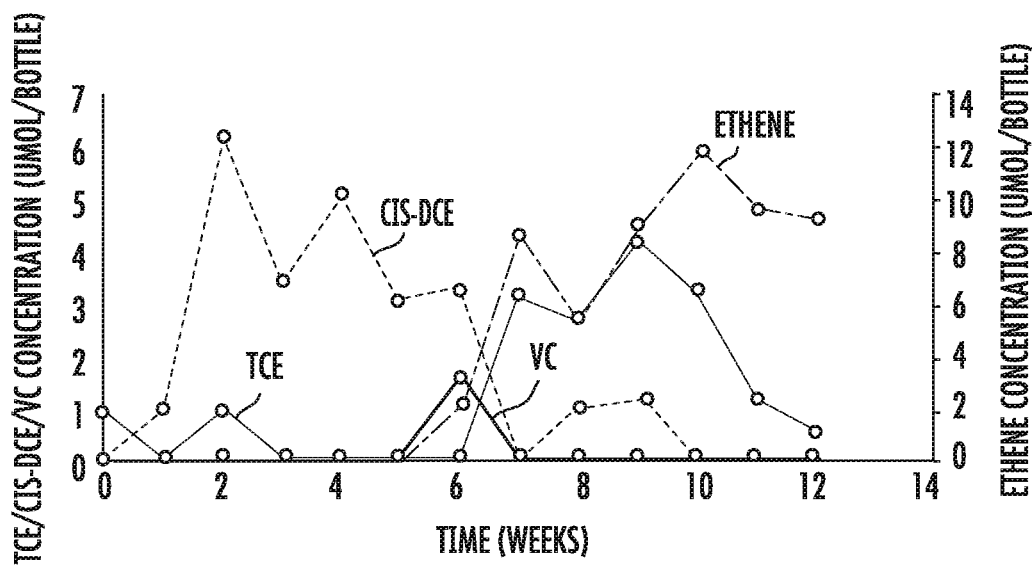
FIG. 12 illustrates biodegradation results for various microbial respiration products using lactate as bioremediation substrate.
Figure 13:
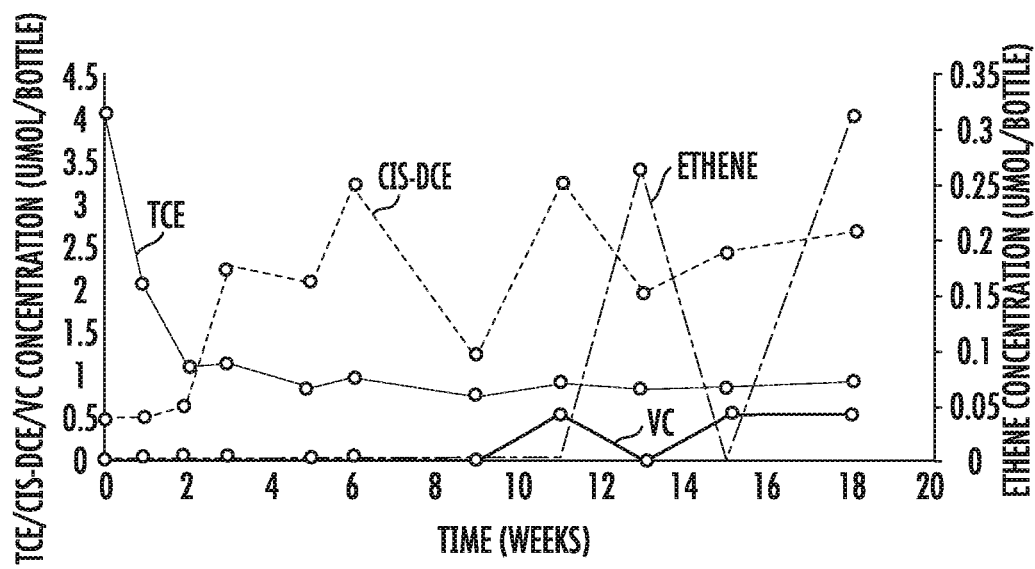
FIG. 13 illustrates biodegradation results for various microbial respiration products using an emulsified oil substrate (EOS) (a plant-based lipid electron donor) microemulsion as bioremediation substrate.
Figure 14:
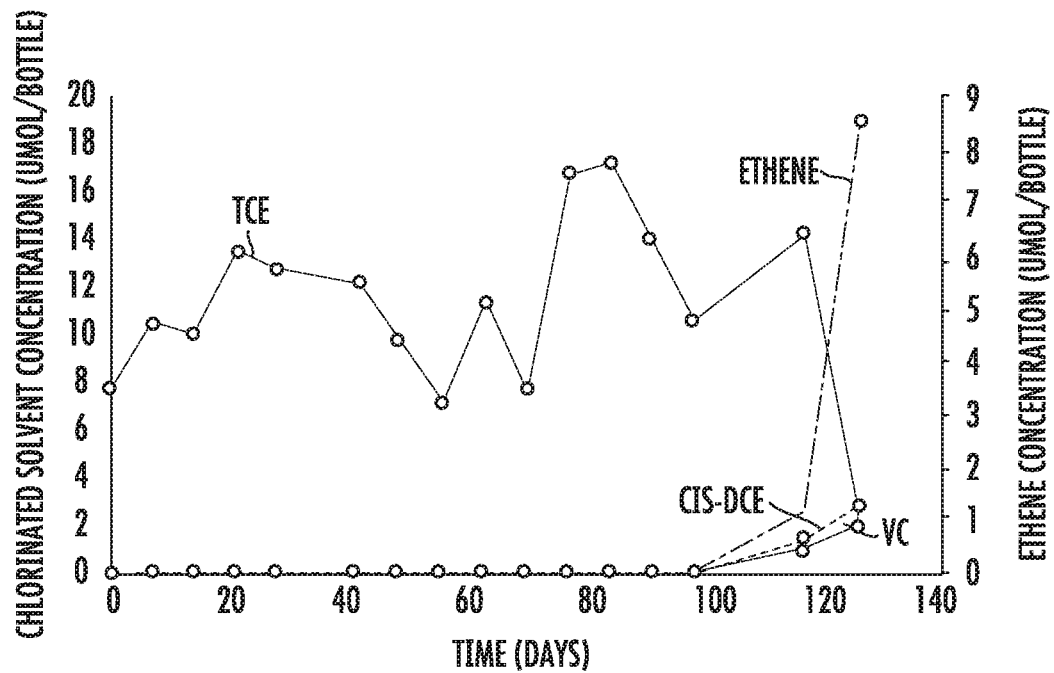
FIG. 14 illustrates biodegradation results for various microbial respiration products using an EOS microemulsion as bioremediation substrate.

FIG. 2-FIG. 5 present amounts of TCE, cis-DCE, VC, and ethene produced in experiments with 9:1 by weight combinations of co-products as electron donor including: tallow and LoPro2 (FIG. 2); brown grease and bone meal (FIG. 3); DAF and LoPro2 (FIG. 4); and DAF and TE 80/20 (FIG. 5). FIG. 6, FIG. 7, FIG. 8, and FIG. 9 present amounts of TCE, cis-DCE, VC, and ethene produced with bone meal utilized as the sole electron donor. FIG. 10 presents amounts of TCE, cis-DCE, VC, and ethene produced with bone meal utilized as the sole electron donor. FIG. 11, FIG. 12, FIG. 13, and FIG. 14 are control incubations with lactate and EOS (soybean oil). Note the x-axis scale difference (time) between experimental and controls.

Figure 15:
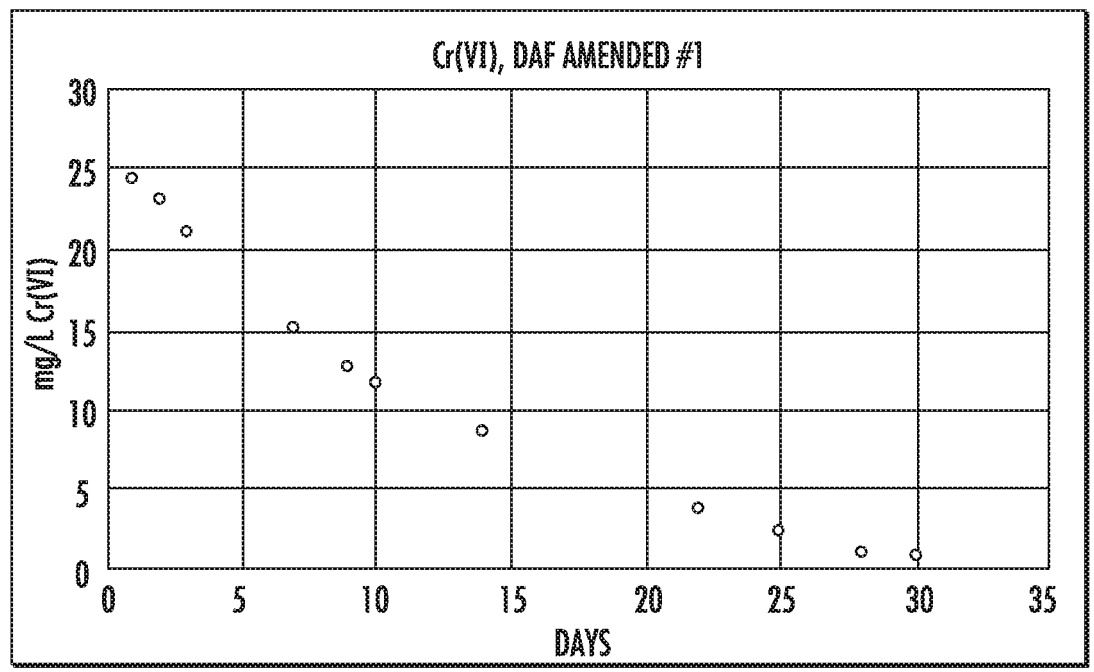
FIG. 15 illustrates the biodegradation results for chromium reduction using DAF as bioremediation substrate.

The bioremediation substrates can also be utilized in reducing metals. FIG. 15 illustrates the results of utilizing DAF as the sole electron donor in bioremediation of hexavalent chromium. The data indicate that the co-products stimulated Cr(VI) reduction. Cr(VI) reduction is linked to Fe(III) reduction (another microbial process) as Fe(II) generated during Fe(III) reduction chemically reduces Cr(VI) to Cr(III). As indicated, total reduction was very fast, with Cr(VI) being reduced to non-detectable levels in a matter of days.

Figure 16:
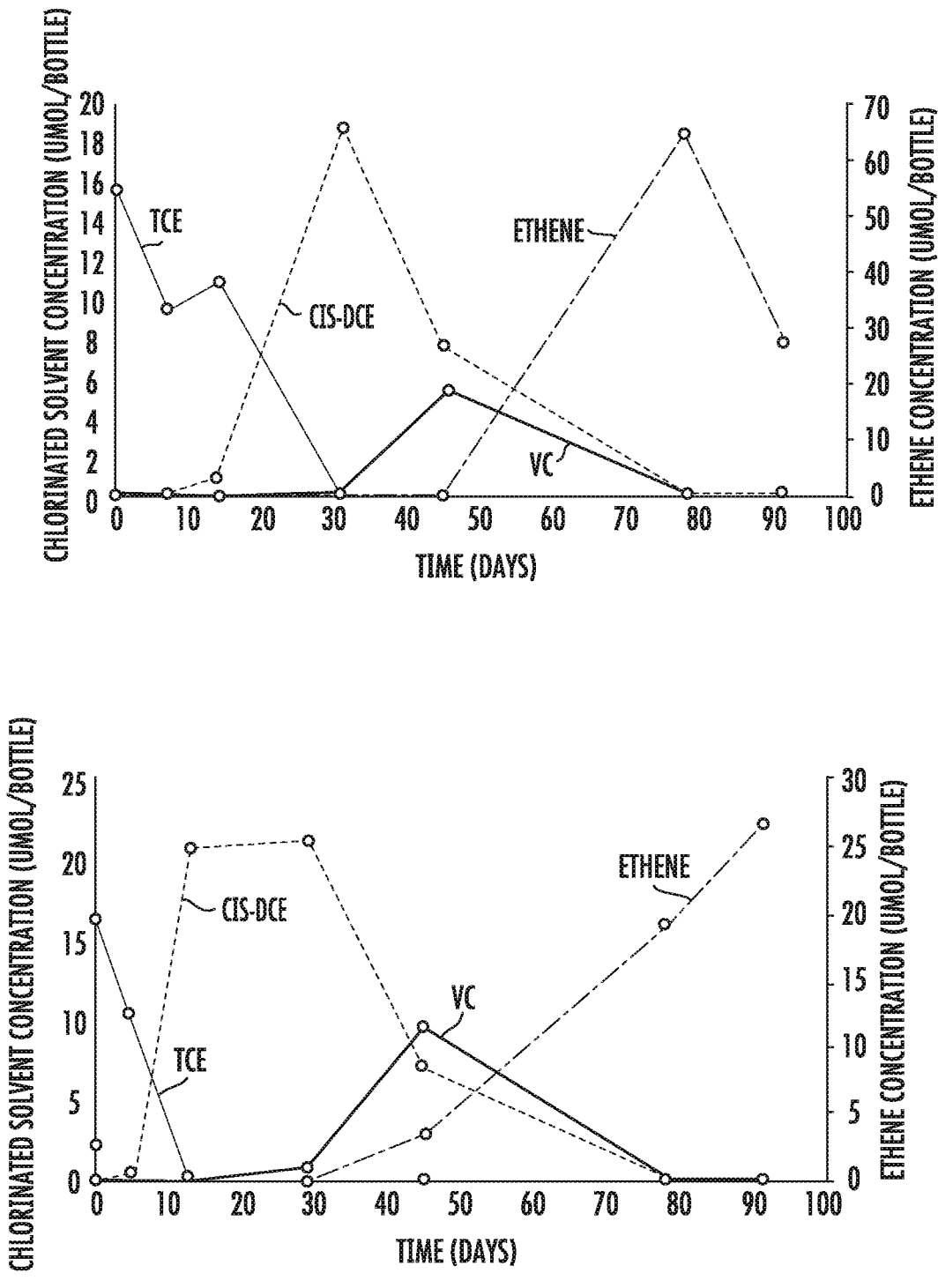
FIG. 16 compares the biodegradation results for various microbial respiration products for a brown grease bioremediation substrate (top) and an EOS bioremediation substrate (bottom).
Figure 17:
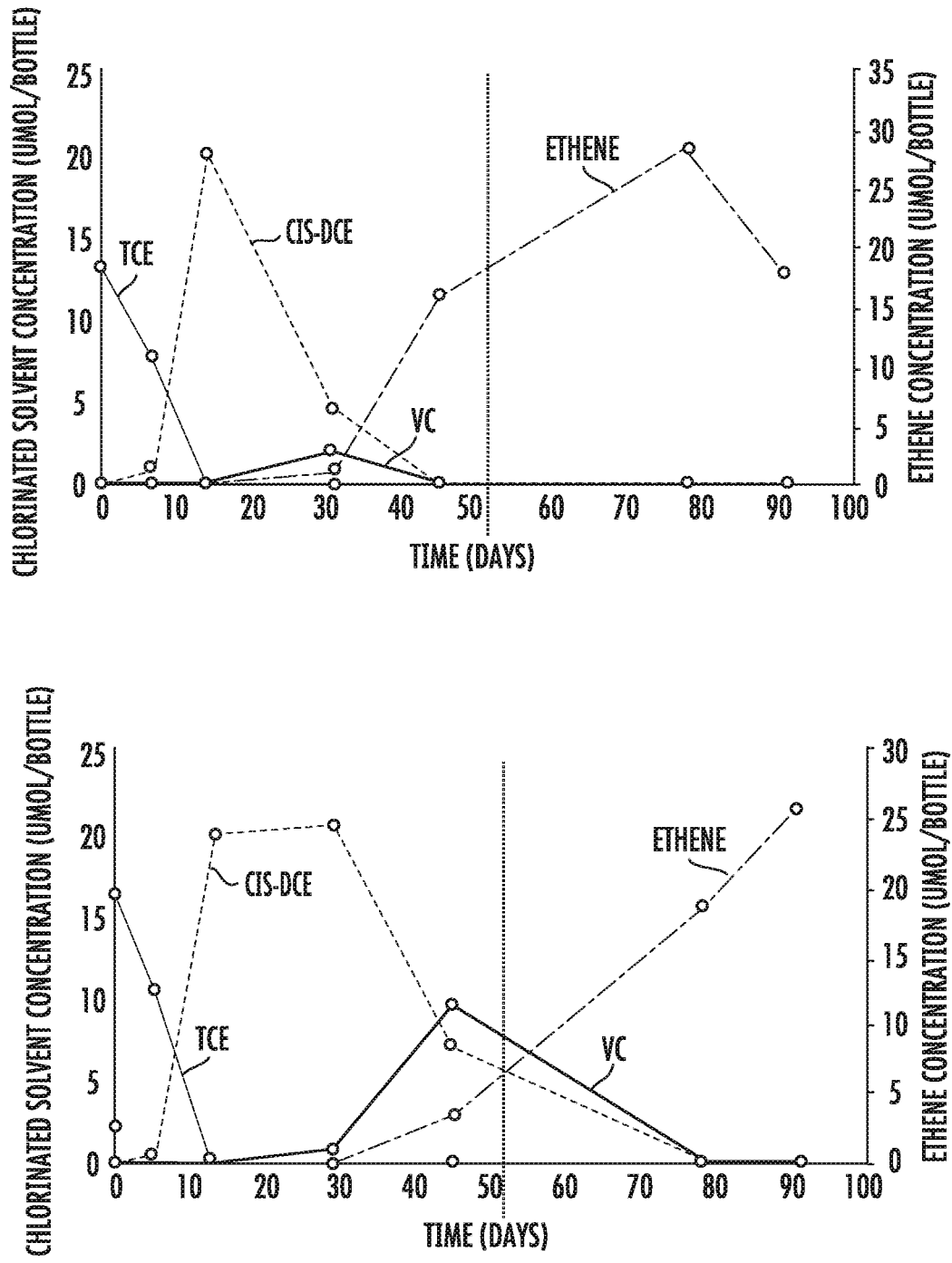
FIG. 17 compares the biodegradation results for various microbial respiration products for a DAF bioremediation substrate (top) and an EOS bioremediation substrate (bottom).
Figure 18:
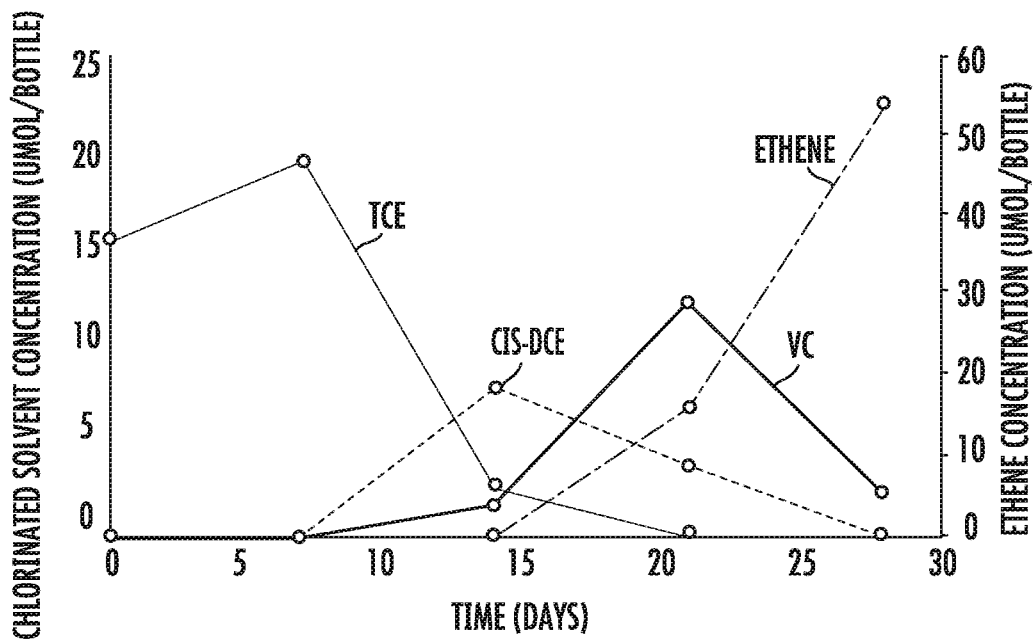
FIG. 18 compares the biodegradation results for various microbial respiration products for a DAF bioremediation substrate (left) and an EOS bioremediation substrate (right).
Figure 18:
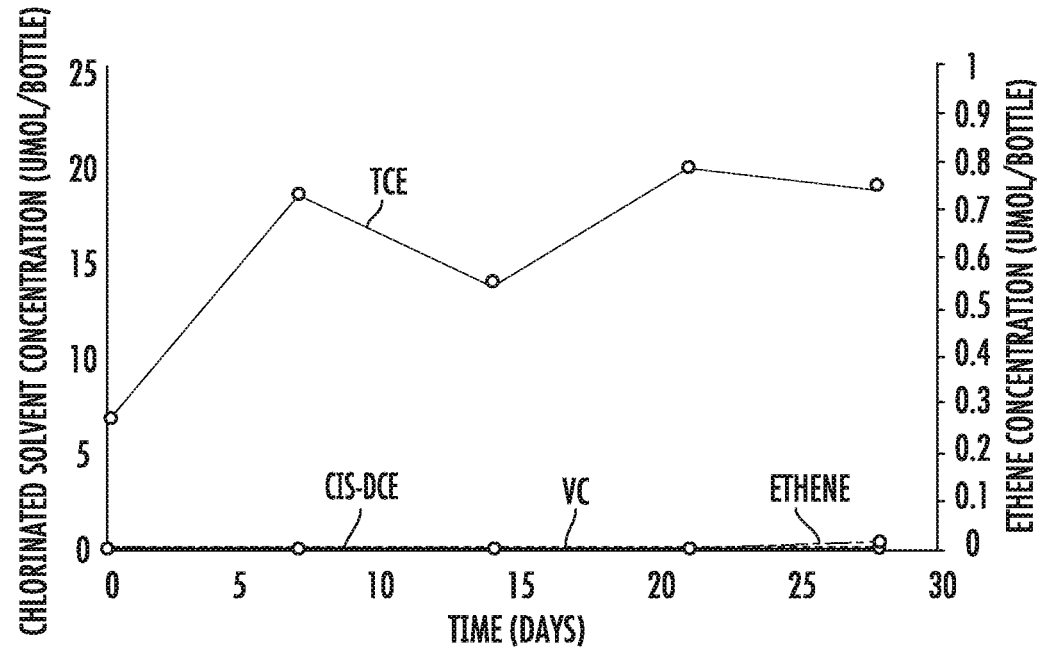
Figure 19:
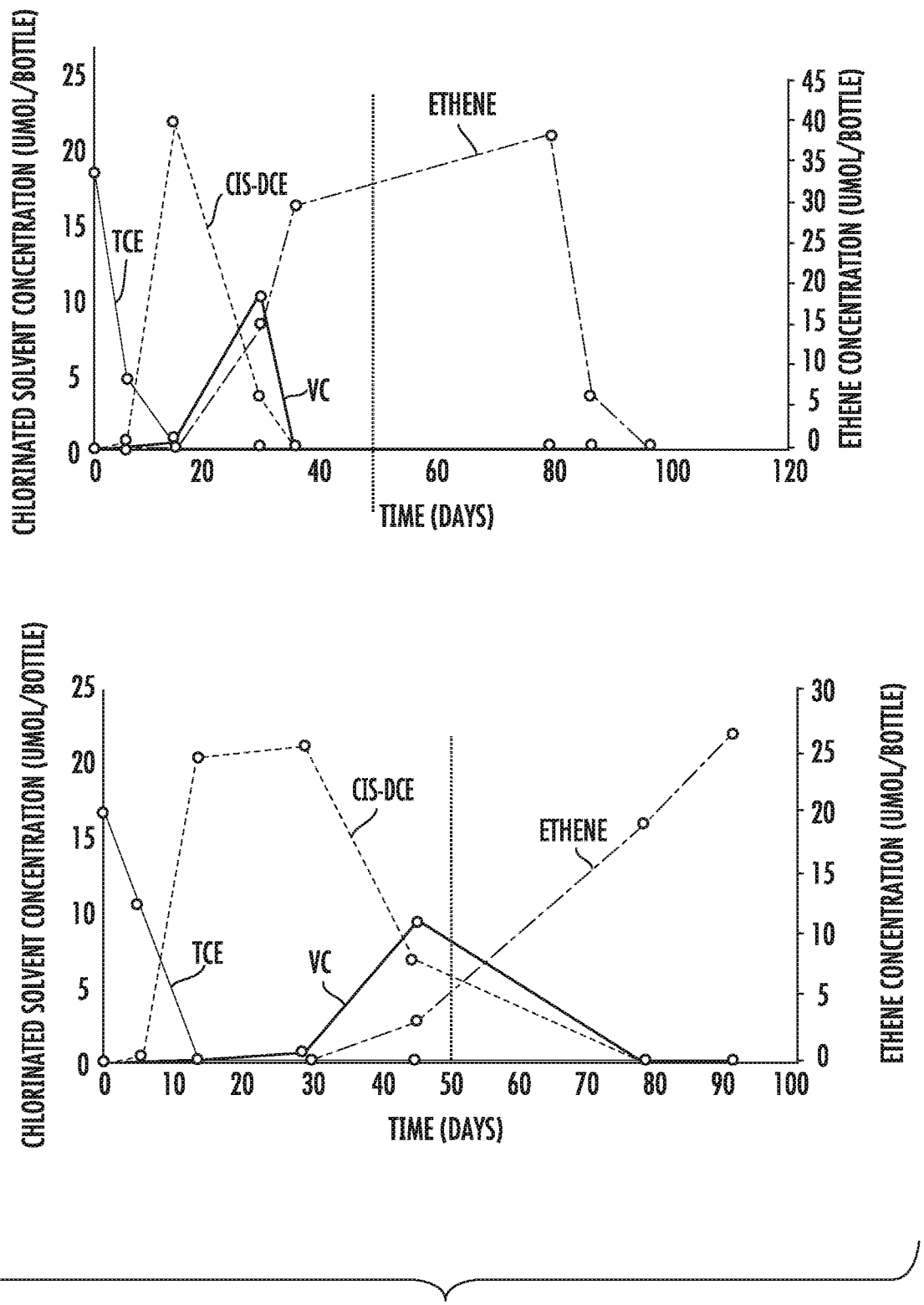
FIG. 19 compares the biodegradation results for various microbial respiration products for a feather meal bioremediation substrate (top) and an EOS bioremediation substrate (bottom).
Figure 20:
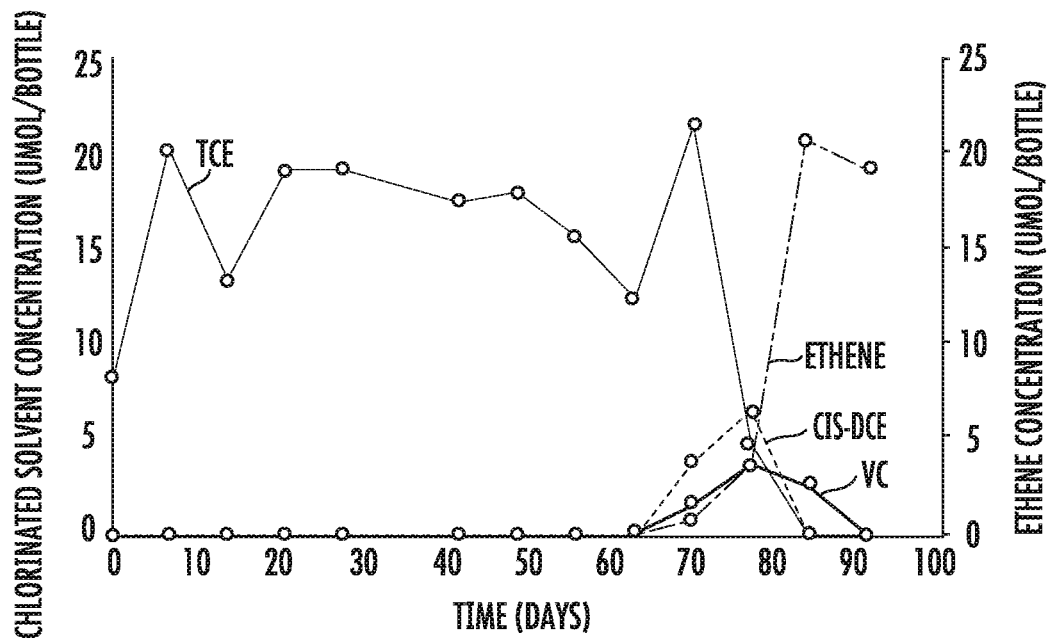
FIG. 20 compares the biodegradation results for various microbial respiration products for an unamended sample (left) and a feather meal bioremediation substrate (right).
Figure 20:
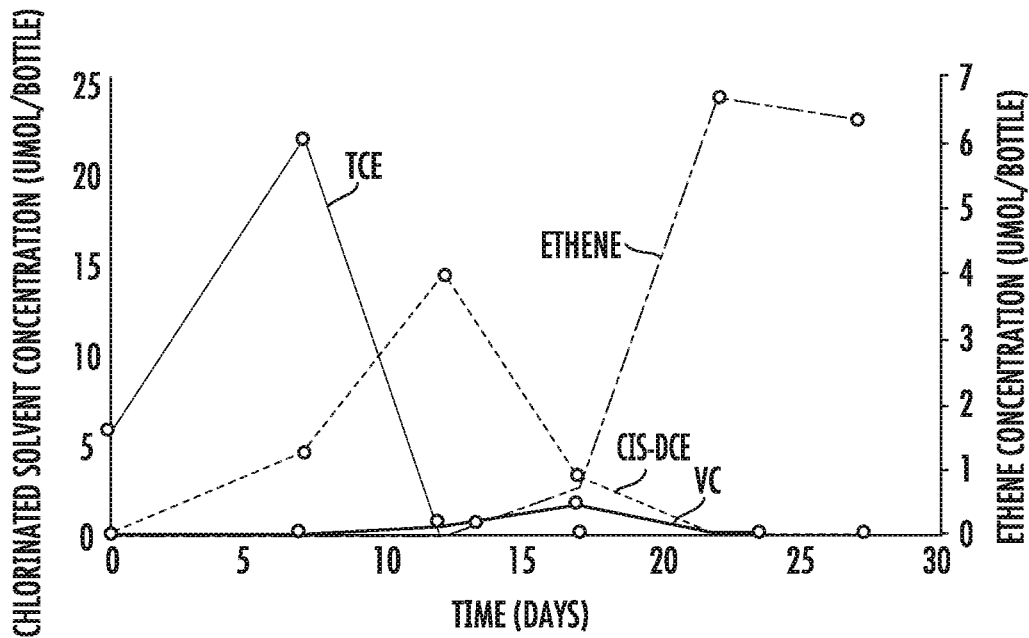
Figure 21:
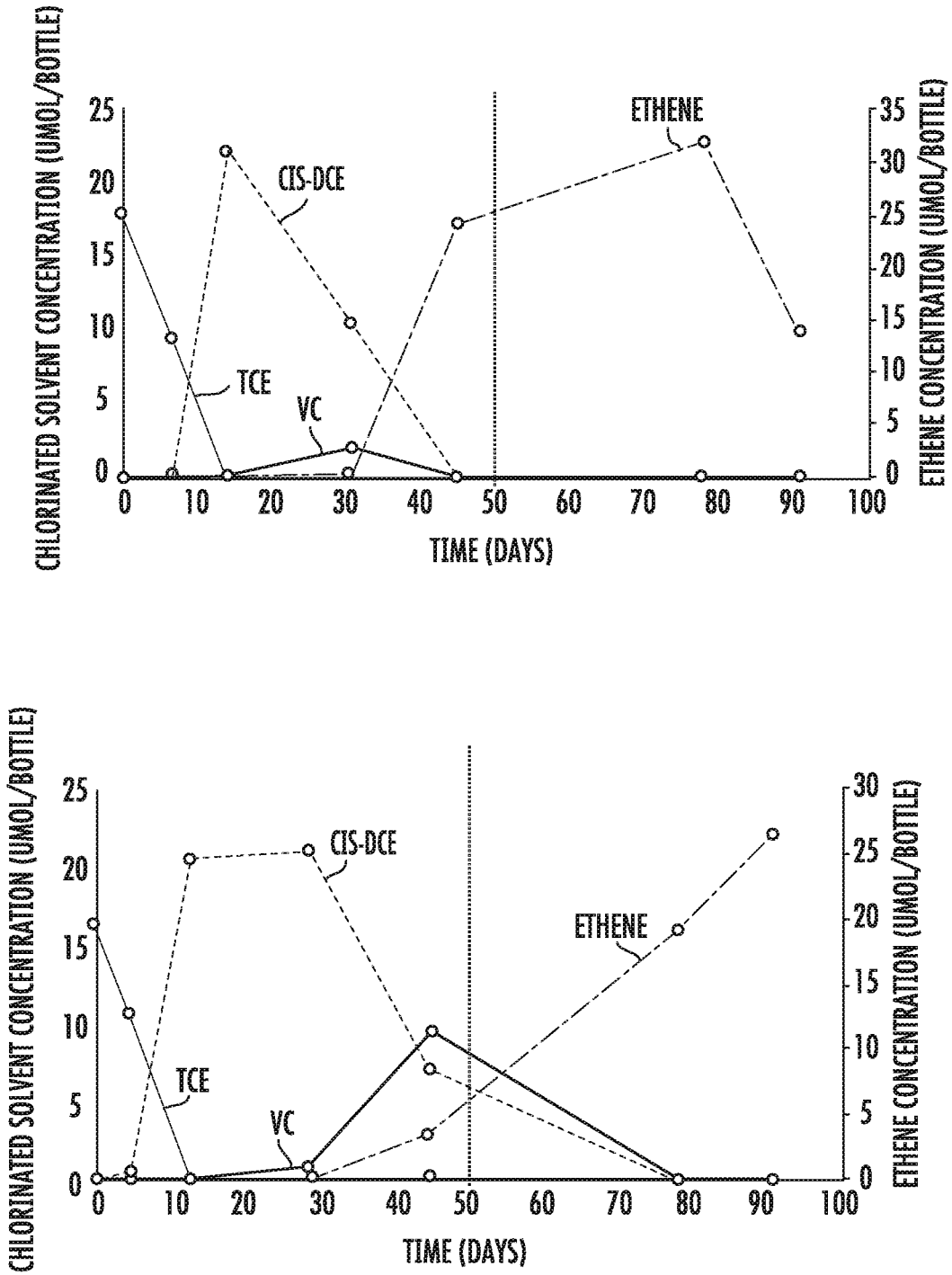
FIG. 21 compares the biodegradation results for various microbial respiration products for a tallow bioremediation substrate (top) and an EOS bioremediation substrate (bottom).
Figure 22:
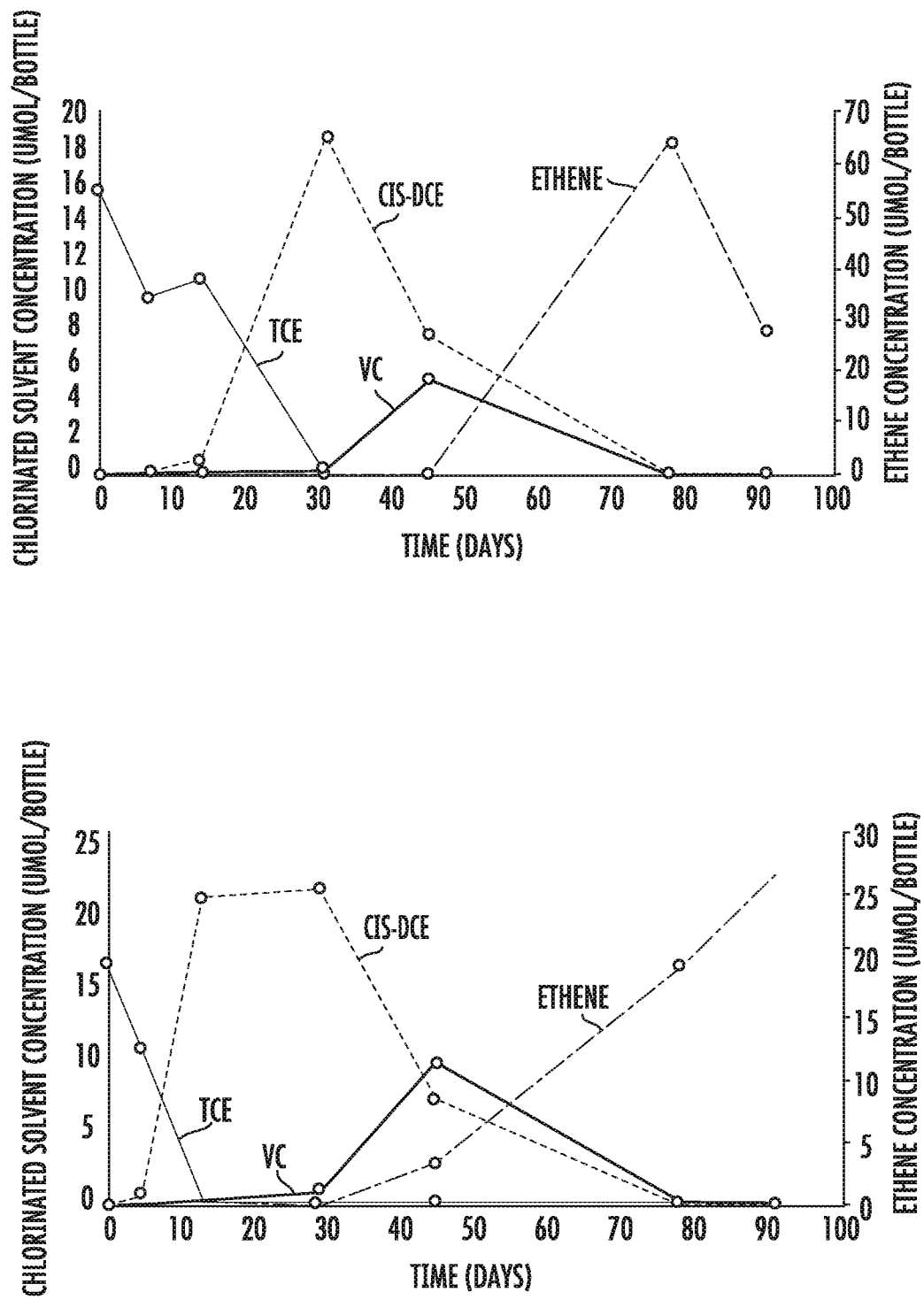
FIG. 22 compares the biodegradation results for various microbial respiration products for a brown grease bioremediation substrate (top) and an EOS bioremediation substrate (bottom).
Figure 23:
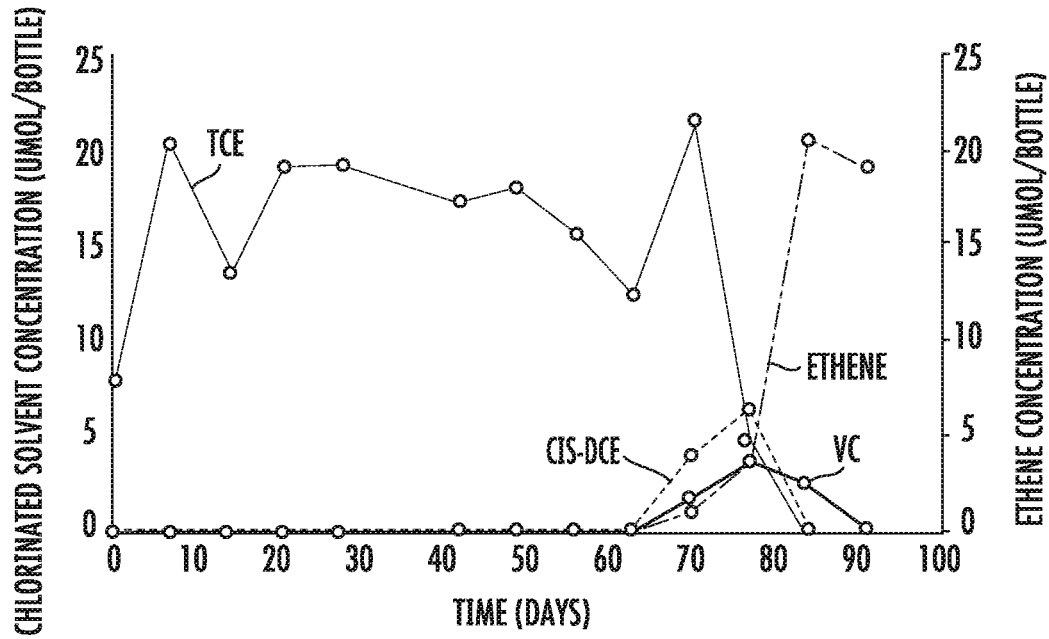
FIG. 23 compares the biodegradation results for various microbial respiration products for an unamended sample (left) and a meat and bone meal (MBM) bioremediation substrate (right).
Figure 23:
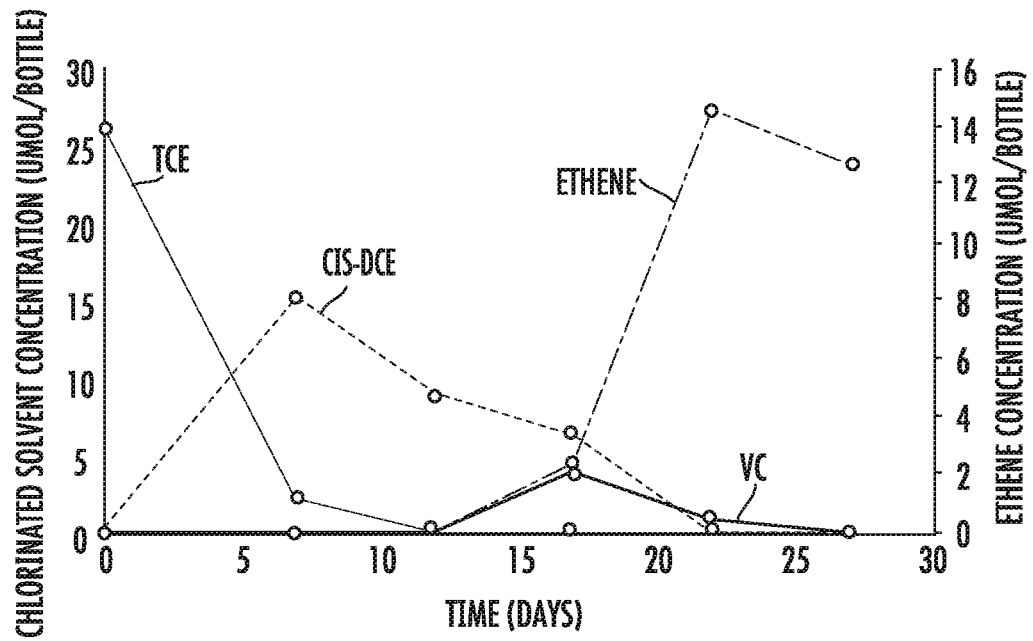

FIG. 16-FIG. 23 present direct comparison between described electron donors and electron donors known in the art. Specifically, FIG. 16 compares the biodegradation results for TCE, cisDCE, VC, and ethene for a brown grease bioremediation substrate (top) and an EOS bioremediation substrate (bottom). FIG. 17 compares the biodegradation results for TCE, cisDCE, VC, and ethene for a DAF bioremediation substrate (top) and an EOS bioremediation substrate (bottom). The line on the graphs of FIG. 17 define the point at which ethene production was stoichiometric in the incubation. FIG. 18 compares the biodegradation results for TCE, cisDCE, VC, and ethene for a DAF bioremediation substrate (left) and an EOS bioremediation substrate (right). FIG. 19 compares the biodegradation results for TCE, cisDCE, VC, and ethene for a feather meal bioremediation substrate (top) and an EOS bioremediation substrate (bottom). The line on the graphs of FIG. 19 define the point at which ethene production was stoichiometric in the incubation. FIG. 20 compares the biodegradation results for TCE, cisDCE, VC, and ethene for an unamended sample (left) and a feather meal bioremediation substrate (right). FIG. 21 compares the biodegradation results for TCE, cisDCE, VC, and ethene for a tallow bioremediation substrate (top) and an EOS bioremediation substrate (bottom). The line on the graphs of FIG. 21 define the point at which ethene production was stoichiometric in the incubation. FIG. 22 compares the biodegradation results for TCE, cisDCE, VC, and ethene for a brown grease bioremediation substrate (top) and an EOS bioremediation substrate (bottom). FIG. 23 compares the biodegradation results for TCE, cisDCE, VC, and ethene for an unamended sample (left) and a meat and bone meal (MBM) bioremediation substrate (right).

Figure 24:
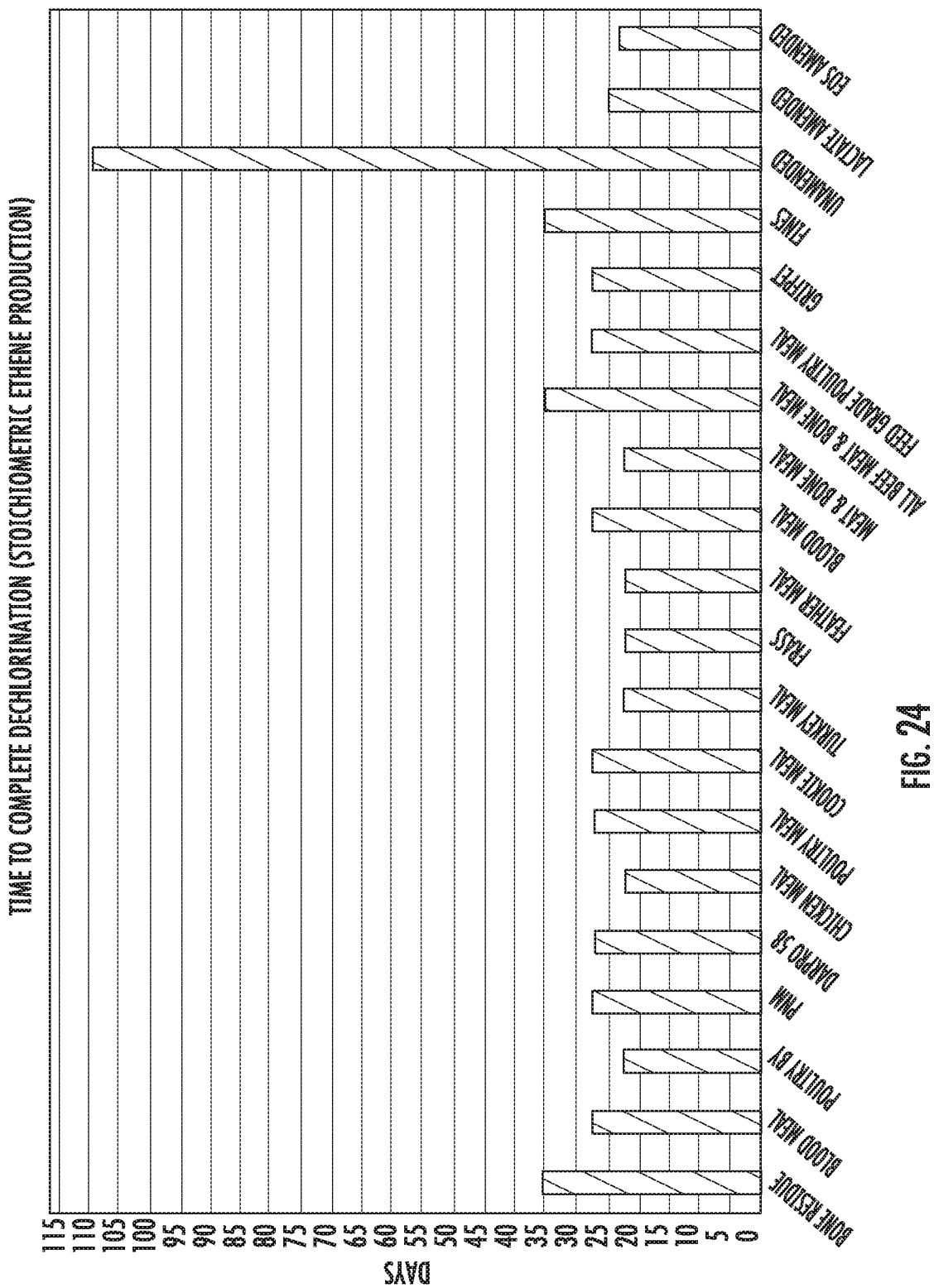
FIG. 24 presents the time to complete dechlorination of a contaminant using a variety of different bioremediation substrates.

FIG. 24 presents the time to complete dechlorination of a contaminant using a variety of different bioremediation substrates. As can be seen, the unamended sample (no substrate added) took the longest amount of time to complete dechlorination. Lactate and EOS were included as control samples on the left of the graph. Also, as shown, all coproducts tested exhibited excellent functionality, on a par, or better than the plant-based lipid only electron donor currently used in the art.

Figure 25:
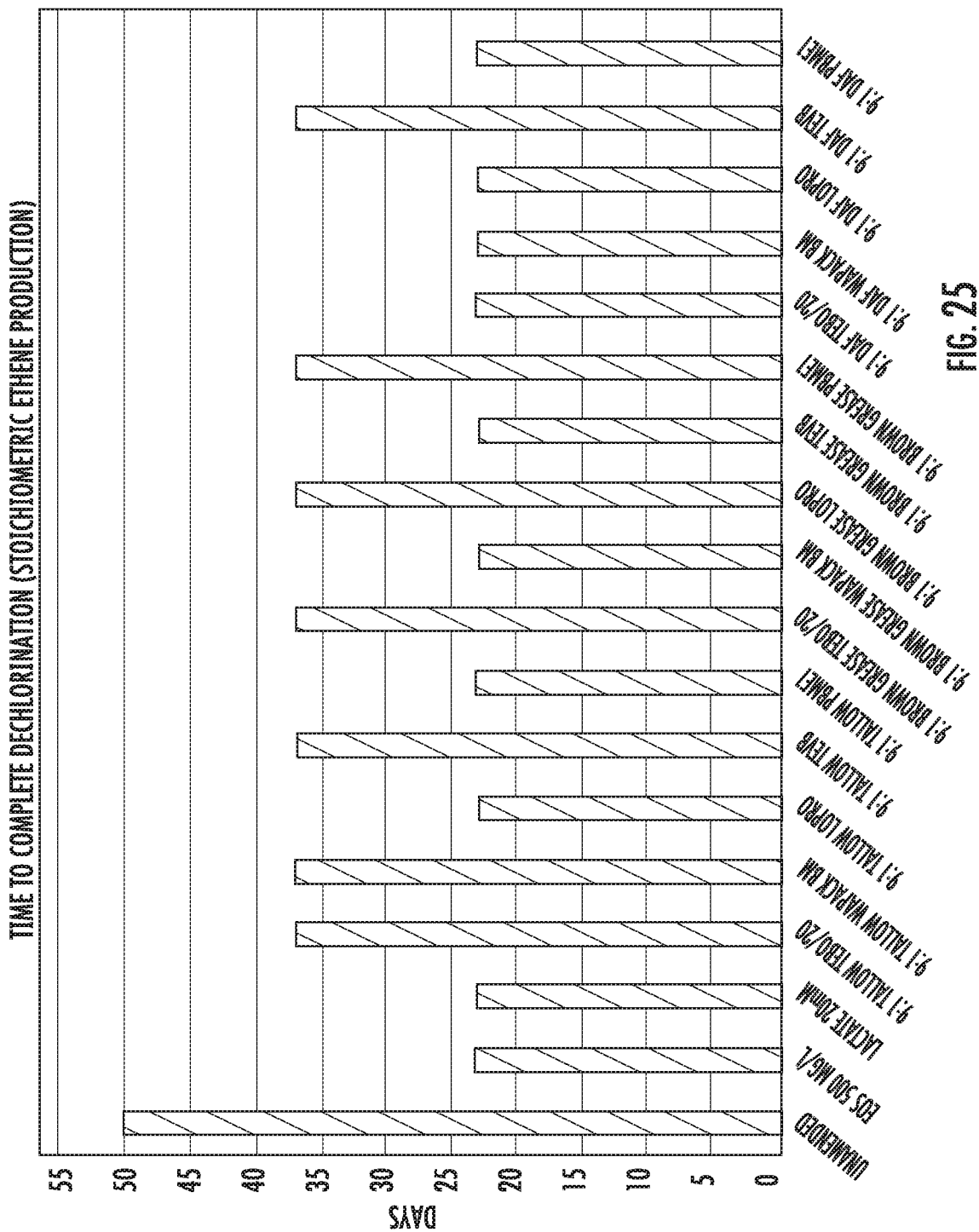
FIG. 25 presents the time to complete dechlorination of a contaminant using a variety of different bioremediation substrates including those incorporating a combination of different animal co-products.

FIG. 25 presents the time to complete dechlorination of a contaminant using a variety of different bioremediation substrates, including those incorporating a combination of different animal co-products. As can be seen, the unamended sample (no substrate added) took the longest amount of time to complete dechlorination. Lactate and EOS were included as control samples on the right of the graph.

Figure 26:
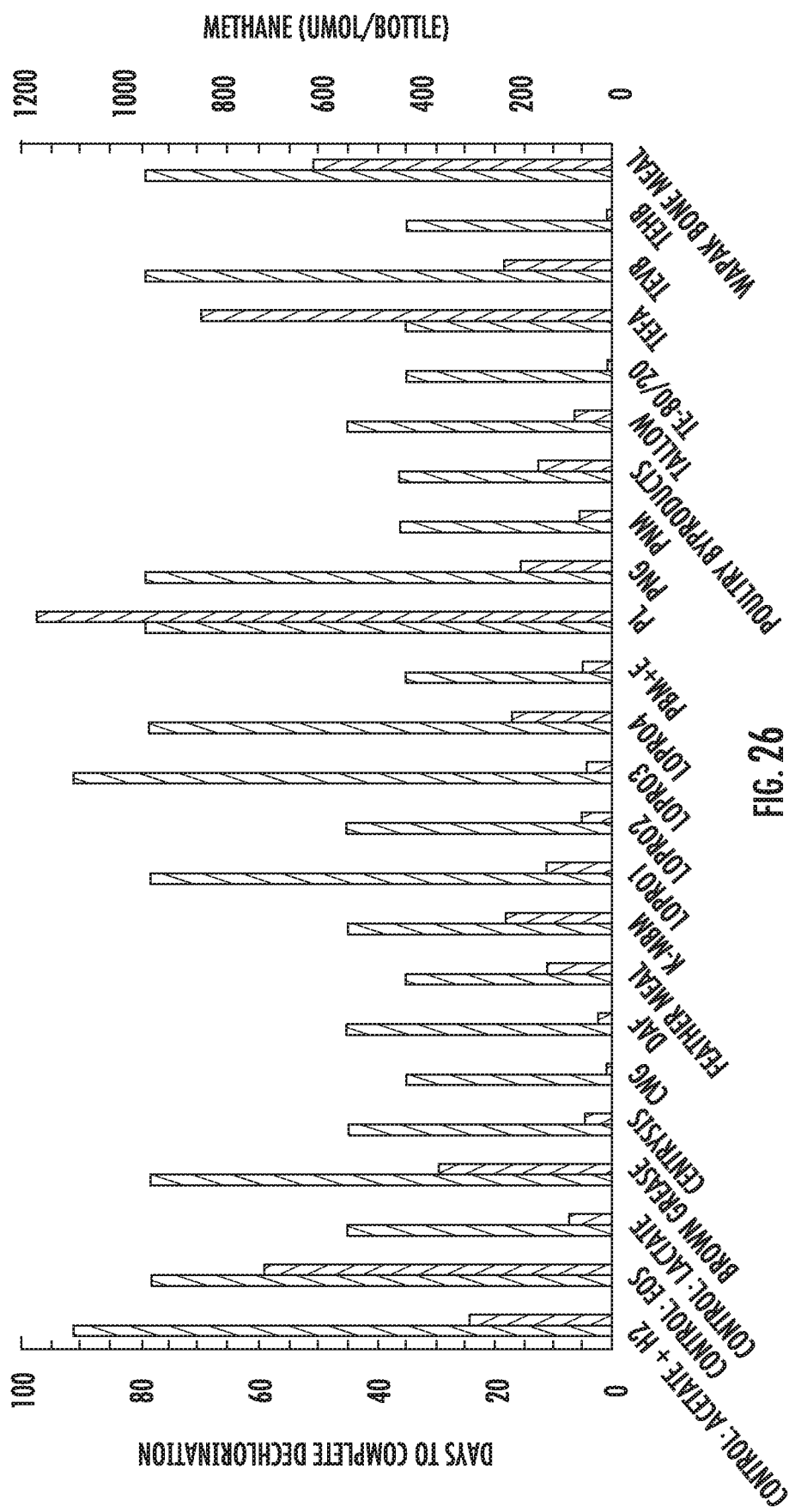
FIG. 26 presents the time to complete dechlorination (left bar of each pair) and methane generation (right bar of each pair) from a contaminant for a variety of different bioremediation substrates.

FIG. 26 presents complete dechlorination data for co-product electron donors over the course of a 12-week protocol. The right columns of each pair are the times until all TCE was reduced to ethene; therefore, the smaller the column, the "better" the co-product functioned as an electron donor. The average time it took for the controls to completely reduce TCE to ethene was 80 days, and nearly all co-products were faster than the controls (on the right). The left columns of each pair illustrate the methane production.

While certain embodiments of the disclosed subject matter have been described using specific terms, such description is for illustrative purposes only, and it is to be understood that changes and variations may be made without departing from the spirit or scope of the subject matter.

What is claimed is:

1. A bioremediation substrate comprising;
   an electron donor, the electron donor comprising;
   a protein constituent in an amount of from about 40 wt. % to about 90 wt. % of the electron donor, the protein constituent comprising animal protein or fragments thereof, the animal protein or fragments thereof comprising bone meal, feather meal, meat and bone meal, or mixtures thereof,
   a lipid constituent in an amount of from about 5 wt. % to about 20 wt. % of the electron donor, the lipid constituent comprising animal lipid; and
   a microbial growth factor in an amount of about 10 wt. % or less of the bioremediation substrate, the microbial growth factor comprising a vitamin, a mineral, an amino acid, or a combination thereof.

2. The bioremediation substrate of claim 1, the lipid constituent having an iodine number of about 70 or less and/or a Reichert-Meissl-Wollny number of about 10 or greater.

3. The bioremediation substrate of claim 1, further comprising a carrier.

4. The bioremediation substrate of claim 3, the carrier comprising a granulated material.

5. The bioremediation substrate of claim 1, wherein the animal protein and the animal lipid are components of an animal co-product.

6. The bioremediation substrate of claim 5, the animal co-product further comprising tallow, brown grease, dissolved air flotation rendering product, LoPro2, TE 80/20, chicken fat, or mixtures thereof.

7. The bioremediation substrate of claim 3, the carrier consisting of a granulated material.

* * * * *